Jan. 3, 1939.　　　　　P. SIMONDS　　　　　2,142,700
VARIABLE SPEED TRANSMISSION
Filed Jan. 12, 1937　　　16 Sheets-Sheet 5

INVENTOR
PAUL SIMONDS
BY
ATTORNEY.

Jan. 3, 1939.  P. SIMONDS  2,142,700

VARIABLE SPEED TRANSMISSION

Filed Jan. 12, 1937   16 Sheets—Sheet 7

INVENTOR
PAUL SIMONDS
BY
ATTORNEY.

Jan. 3, 1939.    P. SIMONDS    2,142,700
VARIABLE SPEED TRANSMISSION
Filed Jan. 12, 1937    16 Sheets-Sheet 10

INVENTOR
PAUL SIMONDS
BY
ATTORNEY.

Jan. 3, 1939.   P. SIMONDS   2,142,700
VARIABLE SPEED TRANSMISSION
Filed Jan. 12, 1937   16 Sheets-Sheet 14

INVENTOR
PAUL SIMONDS
BY
ATTORNEY.

Patented Jan. 3, 1939

2,142,700

UNITED STATES PATENT OFFICE 2,142,700

VARIABLE SPEED TRANSMISSION

Paul Simonds, Milwaukee, Wis.

Application January 12, 1937, Serial No. 120,239

18 Claims. (Cl. 74—283)

This invention relates to variable speed transmissions of the type which will transmit motion from a driving element to a driven element and permit the speed of the driven element to be varied steplessly between a minimum and a maximum speed.

A hydraulic transmission, consisting primarily of a pump and a hydraulic motor, is capable of varying the speed of a driven element steplessly from zero to maximum in either direction of rotation but the mechanical transmissions now in use either employ friction drives, so that the driven element is not positively driven, or they are incapable of varying the speed of the driven element steplessly from zero to maximum.

The present invention has as an object to provide a mechanical transmission which will positively drive a driven element and vary the speed thereof steplessly from zero to maximum.

Another object is to provide a positive drive, stepless, mechanical transmission which is reversible.

Other objects and advantages will appear from the description hereinafter given of a transmission in which the invention is embodied.

The invention is exemplified by the transmission shown somewhat schematically in the accompanying drawings in which the views are as follows.

In order to simplify the views and in order that the operation of the transmission may be more readily understood, only the parts lying substantially upon or immediately behind the section lines have been shown in Figs. 2 to 16 inclusive.

The transmission has its mechanism carried by a frame composed of suitable members, such as four vertical frame members 21, 22, 23 and 24 and six spacers 25, 26, 27, 28, 29 and 30 which retain the frame members in fixed positions relative to each other.

Figure 4:
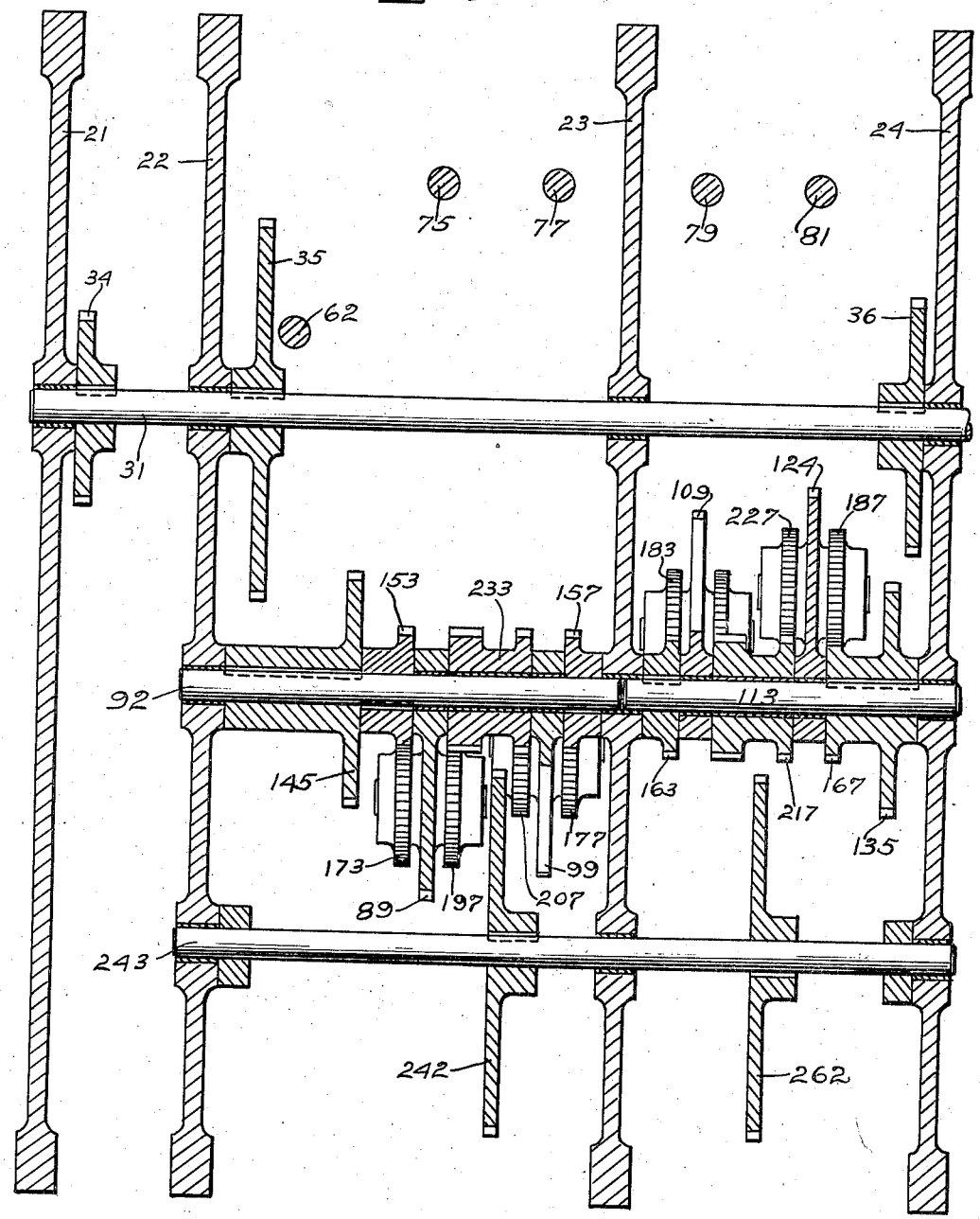
Fig. 4 is a vertical section taken on the line 4—4 of Fig. 1.
Figure 5:
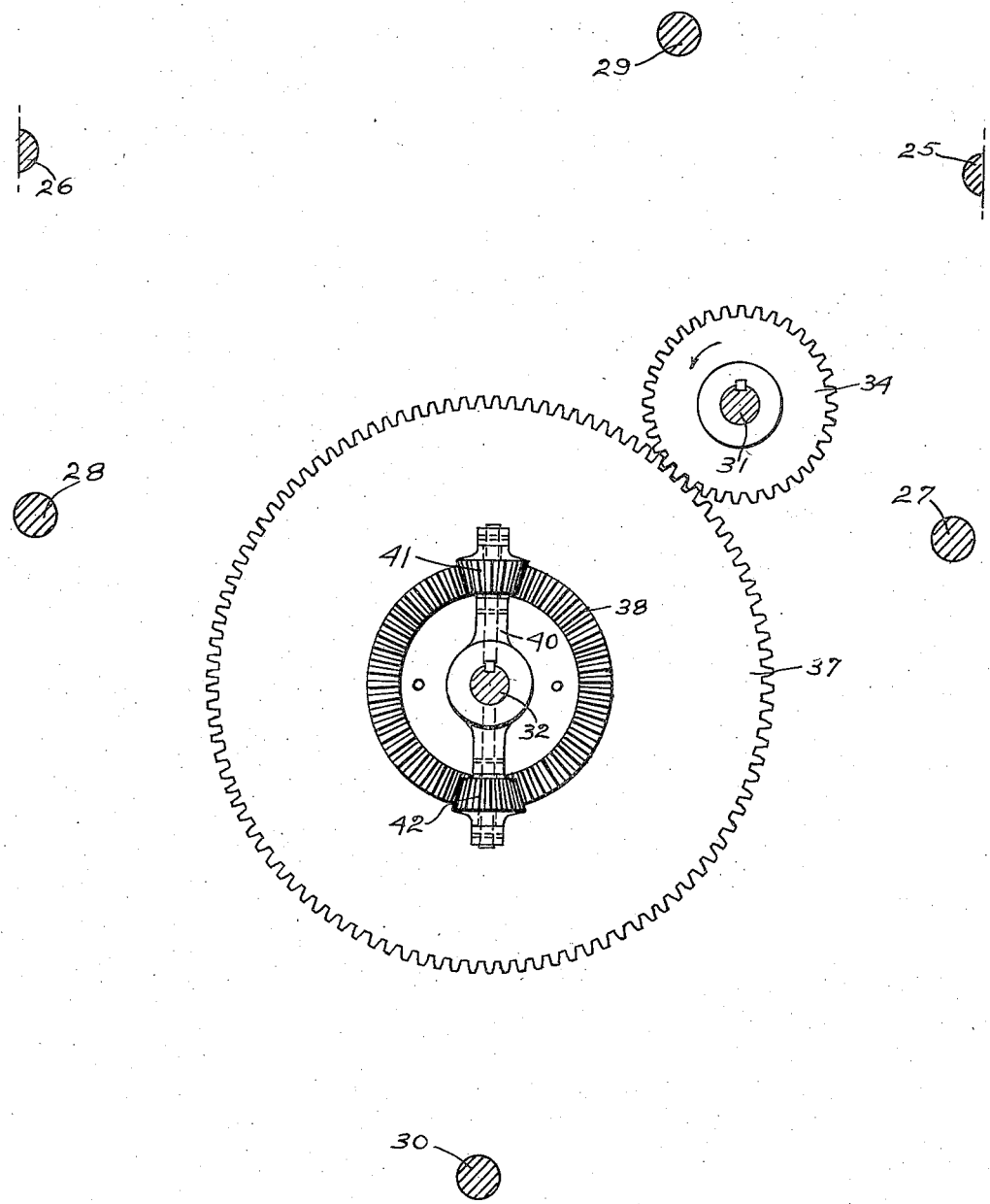
Fig. 5 is a vertical section taken on the line 5—5 of Fig. 2.

Motion is transmitted to the transmission from an external source of power (not shown) through an input shaft 31 which is journaled in frame members 21, 22, 23 and 24 as shown in Fig. 4. For the purpose of explanation, let it be assumed that shaft 31 is being driven at a constant speed of 900 R. P. M. in a counterclockwise direction as viewed in Figs. 5 to 16 inclusive.

Figure 2:
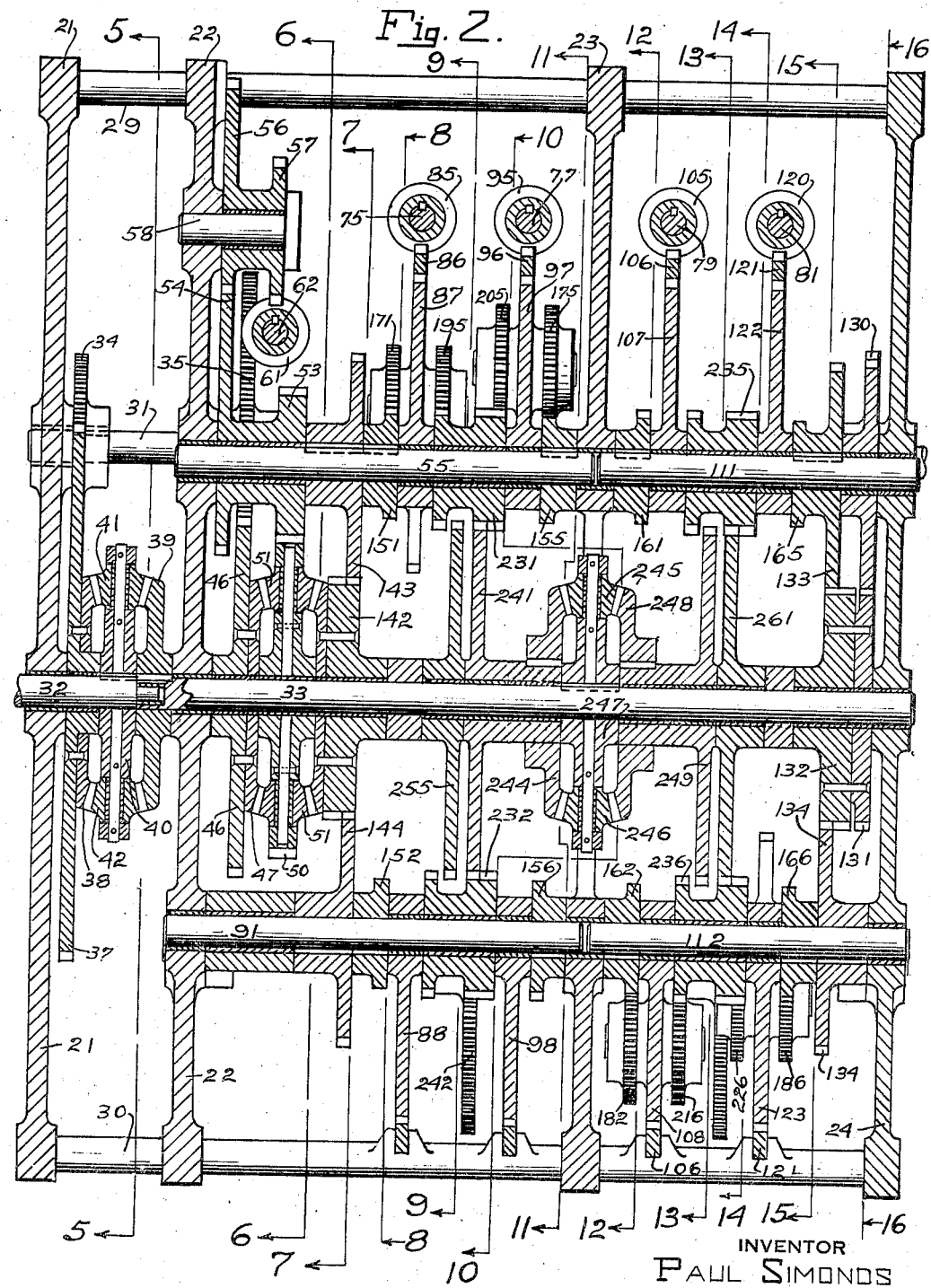
Fig. 2 is a central vertical section taken on the line 2—2 of Fig. 1.

Motion is transmitted from the transmission to the machine to be driven through an output shaft 32 which is journaled in frame member 21 and has its inner end reduced in diameter and journaled in the end of a shaft 33 which is journaled in frame members 22 and 24 as shown in Fig. 2.

Motion is transmitted to output shaft 32 from input shaft 31 through mechanism to be presently described. This mechanism enables output shaft 32 to be driven in either direction at a speed which may be varied steplessly from zero to maximum. With the arrangement shown, the maximum speed of output shaft 32 is 1/18 of the speed of input shaft 31, or 50 R. P. M., so that shaft 32 may be rotated in either direction at any speed from zero to 50 R. P. M.

Input shaft 31 (Fig. 4) has three gears 34, 35 and 36 fixed thereon to rotate therewith. Gear 34 meshes with a gear 37 (Figs. 1, 2 and 5) which is journaled upon shaft 32 and has a bevel gear 38 fixed thereto to rotate therewith. The ratio of gear 34 to gear 37 is 1:3 so that gears 37 and 38 will be driven at a constant speed of 300 R. P. M. in a clockwise direction when input shaft 31 is being driven at 900 R. P. M. in a counterclockwise direction.

Bevel gear 38 forms one input leg of a reversing differential which is shown as consisting primarily of gear 38, a similar bevel gear 39 which forms the other input leg of the differential and is fixed upon shaft 33 at the end thereof, a spider 40 which is arranged between gears 38 and 39 and fixed upon shaft 32, and two spider pinions 41 and 42 which are suitably journaled upon spider 40 and mesh with both of gears 38 and 39.

It is obvious that, if gears 38 and 39 are driven in opposite directions, spider 40 and output shaft 32 will be driven at a speed equal to one-half the difference between the speeds of gears 38 and 39 and in a direction dependent upon which of gears 38 and 39 is rotating the faster.

In the arrangement shown and with input shaft 31 being driven at a constant speed of 900 R. P. M. in a counterclockwise direction, shaft 33 is adapted to be driven in a counterclockwise direction at any speed between 200 R. P. M. and 400 R. P. M. as will presently be explained. With the transmission adjusted as shown, shaft 33 and the gear 39 fixed thereto will be rotated at a constant speed of 400 R. P. M. in a counterclockwise direction.

With gear 38 rotating in a clockwise direction at 300 R. P. M. and gear 39 rotating in a counterclockwise direction at 400 R. P. M., output shaft 32 will be rotated in a counterclockwise direction at 50 R. P. M. If the transmission is adjusted until gear 39 is rotating at 300 R. P. M., output shaft 32 will remain stationary for the reason that gear 38 will be rotating at the same speed but in the opposite direction.

If the transmission is further adjusted until gear 39 is rotating at 200 R. P. M., output shaft 32 will be rotated at 50 R. P. M. in a clockwise direction for the reason that gear 38 is rotating 100 R. P. M. faster in a clockwise direction than gear 39 is rotating in a counterclockwise direction.

Gear 35 on input shaft 31 (Figs. 4 and 6) meshes with and drives a gear 46 (Figs. 2 and 6) which is journaled upon shaft 33 and has a bevel gear 47 fixed thereto. Gears 35 and 46 have the same pitch diameter so that gears 46 and 47 are driven from shaft 31 in a clockwise direction at 900 R. P. M.

Gear 47 forms one leg of a speed adjusting differential which is shown as consisting primarily of gear 47, a similar bevel gear 48 which is journaled upon shaft 33, a differential gear 50 which is journaled upon shaft 33 between gears 47 and 48, and two spider pinions 51 and which are suitably journaled within openings 52 formed diametrically opposite each other in gear 50. Each pinion 51 extends through an opening 52 and meshes with both of gears 47 and 48.

Gear 50 meshes with a gear 53 and is held thereby in the position shown which is the correct position to cause output shaft 32 to be driven at 50 R. P. M. in a counterclockwise direction when input shaft 31 is driven at 900 R. P. M. in a counterclockwise direction. When gear 50 is held stationary, the transmission is adjusted as shown and input shaft 31 is rotating at 900 R. P. M. in a counterclockwise direction, bevel gear 48 will be rotated at 900 R. P. M. in a counterclockwise direction.

Before continuing the description of the driving mechanism, it will be necessary to describe the mechanism for adjusting the transmission to vary the speed of output shaft 32 relative to the speed of input shaft 31 for the reason that certain parts of the driving mechanism are supported by certain parts of the adjusting mechanism.

Gear 53 (Fig. 6) has an irregular shaped gear 54 fixed for rotation therewith, and both of these gears are journaled upon a shaft 55 (Fig. 2) which is journaled in frame members 22 and 23. Gear 54 meshes with an irregular shaped gear 56 which has a worm gear 57 fixed thereto to rotate therewith, and both of these gears are journaled upon a stub shaft 58 fixed in frame member 22.

Worm gear 57 meshes with a worm 61 which is fixed upon a shaft 62 having one end thereof journaled in frame spacer 26 and the other end thereof journaled in a bracket 63 carried by and depending from frame spacer 25.

Shaft 62 has a helical gear 64 fixed thereon and in mesh with a helical gear 65 fixed upon an adjusting shaft 66 (Fig. 1) which is journaled in suitable bearings carried by frame members 22, 23 and 24. Shaft 66 is provided at one of its ends with a hand wheel 67 by means of which it may be rotated to vary the speed and/or the direction of rotation of output shaft 32 as will be presently explained.

Shaft 66 has also fixed thereon four helical gears 70, 71, 72 and 73. Gear 70 meshes with a helical gear 74 (Fig. 9) fixed upon an adjusting shaft 75 which is journaled in suitable bearings arranged in frame spacers 25 and 26. Gear 71 meshes with a helical gear 76 (Fig. 11) fixed upon an adjusting shaft 77 which is journaled in suitable bearings arranged in frame spacers 25 and 26.

Gear 72 meshes with a helical gear 78 (Fig. 13) fixed upon an adjusting shaft 79 which is journaled in suitable bearings arranged in frame spacers 25 and 26. Gear 73 meshes with a helical gear 80 (Fig. 15) fixed upon an adjusting shaft 81 which is journaled in suitable bearings arranged in frame spacers 25 and 26. Rotation of hand wheel 67 will thus cause adjusting shafts 62, 75, 77, 79 and 81 to rotate simultaneously.

Adjusting shaft 75 (Fig. 9) has a worm 85 fixed thereon and in mesh with a ring gear 86 which is supported by and rotatable in suitable guide bearings carried by frame spacers 27, 29 and 30. Worm 85 normally holds ring gear 86 stationary but will rotate it when hand wheel 67 is rotated.

The internal teeth of ring gear 86 mesh with four gear segments 87, 88, 89 and 90 which are arranged 90° apart and normally held by ring gear 86 in stationary positions but will be swung by ring gear 86 to new positions when hand wheel 67 is rotated. Gear segment 87 is journaled upon shaft 55 and gear segments 88, 89 and 90 are journaled, respectively, upon three shafts 91 (Fig. 2), 92 (Fig. 4) and 93 (Fig. 3) which are journaled in frame members 22 and 23.

Adjusting shaft 77 (Fig. 11) has a worm 95 fixed thereon and in mesh with a ring gear 96 which is supported by and rotatable in suitable guide bearings carried by frame spacers 27, 28 and 30. Worm 95 normally holds ring gear 96 stationary but will rotate it when hand wheel 67 is rotated.

The internal teeth of ring gear 96 mesh with four gear segments 97, 98, 99 and 100 which are normally held by ring gear 96 in stationary positions but will be swung by it into new positions when hand wheel 67 is rotated. Gear segments 97, 98, 99 and 100 are journaled, respectively, upon shafts 55, 91, 92 and 93.

Adjusting shaft 79 (Fig. 13) has a worm 105 fixed thereon and in mesh with a ring gear 106 which is supported by and rotatable in suitable guide bearings carried by frame spacers 27, 28 and 30. Worm 105 normally holds ring gear 106 stationary but will rotate it when hand wheel 67 is rotated.

The internal teeth of ring gear 106 mesh with four gear segments 107, 108, 109 and 110 which are arranged 90° apart and normally held by ring gear 106 in stationary positions but will be swung by it into new positions when hand wheel 67 is rotated. Gear segments 107, 108, 109 and 110 are journaled, respectively, upon four shafts 111, 112 (Fig. 2), 113 (Fig. 4) and 114 (Fig. 3) which are journaled in frame members 23 and 24 in axial alinement, respectively, with shafts 55, 91, 92 and 93.

Adjusting shaft 81 (Fig. 15) has a worm 120 fixed thereon and in mesh with a ring gear 121 which is supported by and rotatable in suitable guide bearings carried by frame spacers 27, 28 and 30. Worm 120 normally holds ring gear 121 stationary but will rotate it when hand wheel 67 is rotated.

The internal teeth of ring gear 121 mesh with four gear segments 122, 123, 124 and 125 which are normally held in stationary positions by ring gear 121 but will be swung by it into new positions when hand wheel 67 is rotated. Gear segments 122, 123, 124 and 125 are journaled, respectively, upon shafts 111, 112, 113 and 114.

The functions of the above described parts of the adjusting mechanism will be explained after the remainder of the driving mechanism has been described and the operation of the transmission explained.

Figure 16:
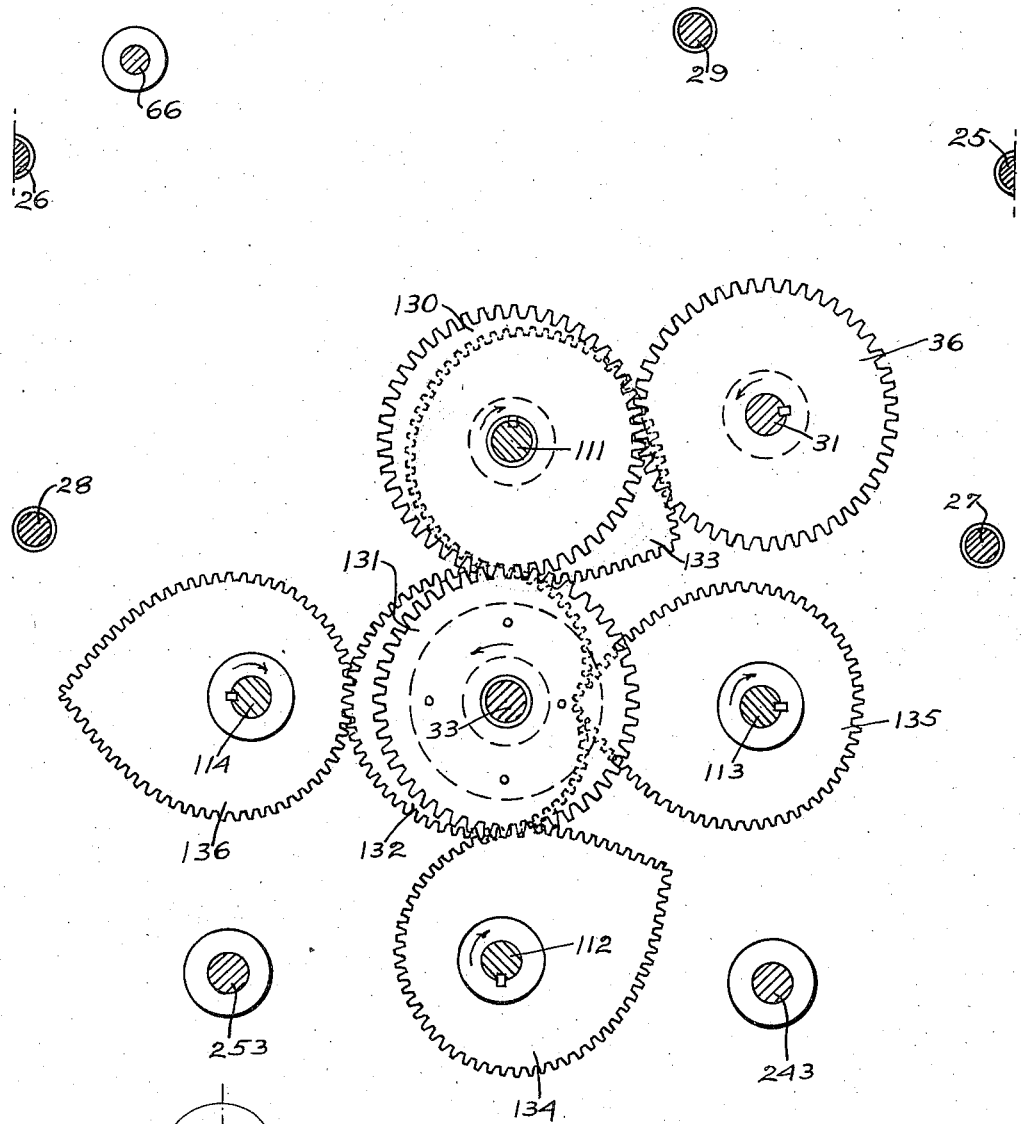
Fig. 16 is a vertical section taken on the line 16—16 of Fig. 2.

Referring first to Figs. 4 and 16, gear 36 on input shaft 31 meshes with an idler gear 130 which is journaled upon shaft 111 (Fig. 2). Gear 130 meshes with and drives a gear 131 which is journaled upon shaft 33 and has an irregular shaped gear 132 fixed thereto to rotate therewith.

Gear 131 has the same pitch diameter as gear 36 so that it and gear 132 are rotated upon shaft 33 at 900 R. P. M. in a counterclockwise direction in unison with shaft 31.

Irregular shaped gear 132 meshes with and drives four complementary irregular shaped gears 133, 134, 135 and 136 which are identical to each other and fixed, respectively, upon shafts 111, 112, 113 and 114 to drive the same.

Irregular shaped gear 132 is exactly the same as an irregular shaped gear 142 (Figs. 2 and 7) which is journaled upon shaft 33 and fixed to bevel gear 48 so that it is rotated therewith at 900 R. P. M. in a counterclockwise direction when the transmission is adjusted as shown and input shaft 31 is rotating at the same speed in a counterclockwise direction as previously explained.

Irregular shaped gear 142 meshes with and drives four complementary irregular shaped gears 143, 144, 145 and 146 which are fixed, respectively, upon shafts 55 and 91 (Fig. 2), shaft 92 (Fig. 4) and shaft 93 (Fig. 3) to drive the same. Irregular shaped gears 143, 144, 145 and 146 are identical to each other and to irregular shaped gears 133, 134, 135 and 136.

The above mentioned irregular shaped gears are so designed that, when a driving gear 132 or 142 is rotating in one direction at a constant speed, the driven gears meshing therewith will be rotated in the opposite direction at speeds which vary uniformly from one-third to one and two-thirds times the speed of the driving gear.

Consequently, when gear 132 is rotated at 900 R. P. M. in a counterclockwise direction, gears 133, 134, 135 and 136 and shafts 111, 112, 113 and 114 will be rotated in a clockwise direction at speeds which vary uniformly from 300 R. P. M. to 1500 R. P. M. and, when gear 142 is rotating at 900 R. P. M. in a counterclockwise direction, gears 143, 144, 145 and 146 and shafts 55, 91, 92 and 93 will be rotated in a clockwise direction at speeds which vary uniformly from 300 R. P. M. to 1500 R. P. M.

Figure 17:
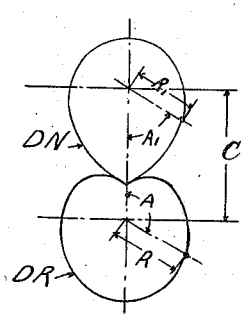
Fig. 17 is a diagram of the pitch lines of a pair of intermeshing irregular shaped gears one of which will rotate at a speed which will vary uniformly relative to the speed of the other gear when one of the gears is driven.

In the transmission shown, the above described irregular shaped gears have pitch lines of the shapes shown in Fig. 17 and each gear is symmetrical about a line coinciding with its major and minor radii. In Fig. 17, the figure DR represents the pitch line of each of the two driving gears 132 and 142, and the figure DN represents the pitch line of each of the driven gears 133, 134, 135, 136, 143, 144, 145 and 146.

The pitch line of each gear may be produced by determining from the following formulas the lengths of a sufficient number of radii, for instance the radius at each tooth, and then connecting the outer ends of the radii:

$$R = \frac{C\left[V_{min} + \frac{(V_{max}-V_{min})A}{180}\right]}{V_{min} + \frac{(V_{max}-V_{min})A}{180} + \frac{V_{max}+V_{min}}{2}}$$

$$R_1 = \frac{C\left(\frac{V_{max}+V_{min}}{2}\right)}{\frac{V_{max}+V_{min}}{2} + \sqrt{V_{min} + \frac{(V_{max}^2 - V_{min}^2)A}{180}}}$$

In the formulas:

R is the pitch radius of gear DR at angle A.
$R_1$ is the pitch radius of gear DN at angle $A_1$.
A is the angle from the minimum radius of gear DR with a maximum of 180° (the gear being symmetrical).
$A_1$ is the angle from the maximum radius of gear DN with a maximum of 180° (the gear being symmetrical).
C is the distance between gear centers in inches.
$V_{min}$ is the minimum angular velocity of gear DN. For simplicity, let the value be 1.
$V_{max}$ is the maximum angular velocity of gear DN. The value may be the desired multiple of $V_{min}$.

$$\frac{V_{min}-V_{max}}{2}$$

will always be equal to the velocity of gear DR because the average speed of gear DN is equal to the speed of gear DR.

With the irregular shaped gears designed and driven as explained above, each driven gear will be accelerated from 300 R. P. M. to 1500 R. P. M. during one-half of each revolution and be decelerated from 1500 R. P. M. to 300 R. P. M. during the other half of each revolution. Before explaining how these varying speeds are utilized, the mechanisms driven by the irregular shaped gears will be described.

As previously explained, irregular shaped gears 133, 134, 135 and 136 (Fig. 16) are fixed upon and drive shafts 111, 112, 113 and 114 respectively, and irregular shaped gears 143, 144, 145 and 146 (Fig. 7) are fixed upon and drive shafts 55, 91, 92 and 93 respectively. Each of these shafts has two mutilated gears fixed thereon and adapted to intermittently mesh with two other gears.

Figure 3:
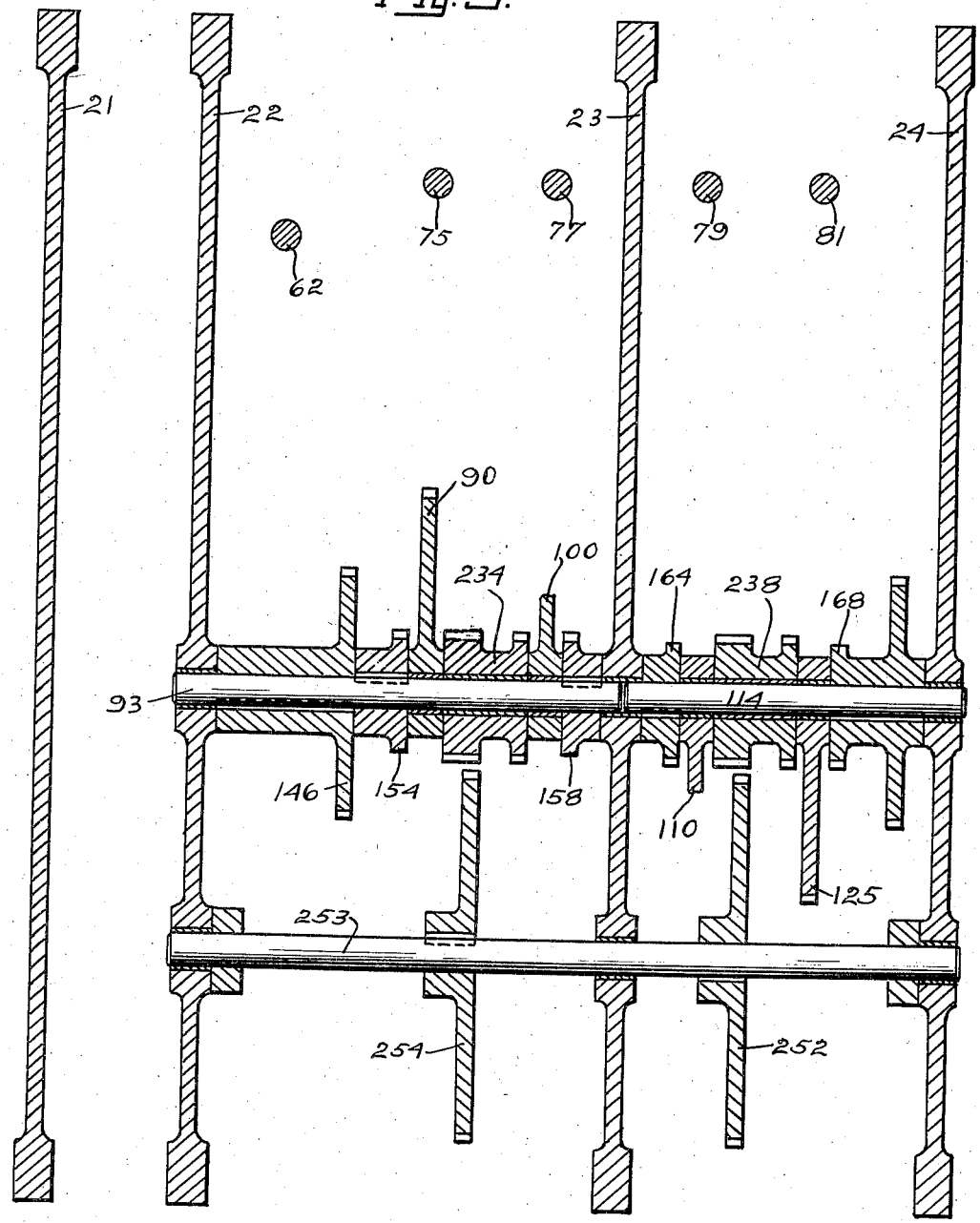
Fig. 3 is a vertical section taken on the line 3—3 of Fig. 1.

Mutilated gears 151, 152, 153 and 154 (Fig. 8) are fixed, respectively, upon shafts 55 and 91 (Fig. 2), shaft 92 (Fig. 4) and shaft 93 (Fig. 3). Mutilated gears 155, 156, 157 and 158 (Fig. 11) are also fixed, respectively, upon shafts 55, 91, 92 and 93.

Mutilated gears 161, 162, 163 and 164 (Fig. 12) are fixed, respectively, upon shafts 111 and 112 (Fig. 2), shaft 113 (Fig. 4) and shaft 114 (Fig. 3). Mutilated gears 165, 166, 167 and 168 (Fig. 15) are also fixed upon shafts 111, 112, 113 and 114 respectively.

Mutilated gears 151, 152, 153 and 154 (Fig. 8) are adapted to mesh, respectively, during a part of each revolution with gears 171, 172, 173 and 174; gears 155, 156, 157 and 158 (Fig. 11) are adapted to mesh, respectively, during a part of each revolution with gears 175, 176, 177 and 178; gears 161, 162, 163 and 164 (Fig. 12) are adapted to mesh, respectively, during a part of each revolution with gears 181, 182, 183 and 184; and gears 165, 166, 167 and 168 (Fig. 15) are adapted to mesh, respectively, during a part of each revolution with gears 185, 186, 187 and 188.

Gears 171, 172, 173 and 174 (Fig. 8) are fixed, respectively, upon the left ends of shafts 191, 192, 193 and 194 which are journaled, respectively, in gear segments 87, 88, 89 and 90 (Fig. 9) and have gears 195, 196, 197 and 198 fixed, respectively, upon the right ends thereof.

Gears 175, 176, 177 and 178 (Fig. 11) are fixed, respectively, upon the right ends of shafts 201, 202, 203 and 204 which are journaled, respectively, in gear segments 97, 98, 99 and 100 and have gears 205, 206, 207 and 208 (Fig. 10) fixed, respectively, upon the left ends thereof.

Gears 181, 182, 183 and 184 (Fig. 12) are fixed, respectively, upon the left ends of shafts 211, 212, 213 and 214 which are journaled, respectively, in gear segments 107, 108, 109 and 110 (Fig. 13) and have gears 215, 216, 217 and 218 fixed, respectively, upon the right ends thereof.

Gears 185, 186, 187 and 188 (Fig. 15) are fixed, respectively, upon the right ends of shafts 221, 222, 223 and 224 which are journaled, respectively, in gear segments 122, 123, 124 and 125 and have gears 225, 226, 227 and 228 (Fig. 14) fixed, respectively, upon the left ends thereof.

Gears 195, 196, 197 and 198 (Fig. 9) mesh, respectively, with wide-faced gears 231, 232, 233 and 234 which are journaled, respectively, upon shafts 55 and 91 (Fig. 2), shaft 92 (Fig. 4) and shaft 93 (Fig. 3). Gears 205, 206, 207 and 208 (Fig. 10) also mesh, respectively, with wide-faced gears 231, 232, 233 and 234.

Gears 215, 216, 217 and 218 (Fig. 13) mesh, respectively, with wide-faced gears 235, 236, 237 and 238 which are journaled, respectively, upon shafts 111 and 112 (Fig. 2), shaft 113 (Fig. 4) and shaft 114 (Fig. 3). Gears 225, 226, 227 and 228 (Fig. 14) also mesh, respectively, with wide-faced gears 235, 236, 237 and 238.

Each of wide-faced gears 231 to 238 has a groove formed in its periphery to clear another gear to be presently described. The mutilated gears fixed upon shafts 55, 91 to 93 and 111 to 114, wide-faced gears 231 to 238 and the gears carried by the gear segments and meshing with the mutilated and wide faced gears, that is, gears 171 to 178, 181 to 188, 195 to 198, 205 to 208, 215 to 218 and 225 to 228, have the same pitch diameter so that, when either mutilated gear fixed upon one of those shafts meshes with its mating gear, the wide faced gear journaled upon the same shaft will be rotated at the same speed as the shaft and through an angular distance determined by the number of teeth on the mutilated gear, which, in the transmission as shown, is 60°.

Wide-faced gears 231 and 232, (Figs. 2 and 10) also mesh with and drive a gear 241 journaled upon shaft 33 and meshing with a gear 242 which is fixed upon a shaft 243 (Fig. 4) journaled in frame members 22, 23 and 24. The ratio of gears 231 and 232 to gears 241 and 242 is 1:3 so that gears 241 and 242 are driven at one-third the speeds of gears 231 and 232.

Gear 241 (Figs. 2 and 10) has a bevel gear 244 fixed thereto to rotate therewith. Bevel gear 244 meshes with two spider pinions 245 and 246 journaled upon suitable trunnions carried by a spider 247 which is fixed upon shaft 33 as shown in Fig. 2. Pinions 245 and 246 mesh with a bevel gear 248 (Figs. 2 and 12) which is identical to gear 244 and fixed for rotation with a spur gear 249 (Fig. 13) which is identical to gear 241 and journaled upon shaft 33. These bevel gears, pinions and spider form a speed leveling differential the function of which will be presently explained.

Gear 249 (Fig. 13) meshes with wide faced pinions 237 and 238 and with a gear 252 which is fixed upon a shaft 253 (Fig. 3) journaled in frame members 22, 23 and 24.

Shaft 253 also has a gear 254 (Fig. 9) fixed thereon and in mesh with a gear 255 which is journaled upon shaft 33 and meshes also with wide faced gears 233 and 234.

Wide faced pinions 235 and 236 (Figs. 2 and 14) also mesh with and drive a gear 261 which is journaled upon shaft 33 and meshes with a gear 262 fixed upon shaft 243 (Fig. 4).

From the foregoing, it will be noted that each of shafts 55, 91, 92, 93, 111, 112, 113 and 114 has two mutilated gears fixed thereon and one wide faced gear journaled thereon, and that with the transmission adjusted as shown, each of the mutilated gears fixed on a shaft drives during one-sixth of each revolution the wide faced gear journaled upon the same shaft.

As previously explained, wide faced gears 231 and 232 (Fig. 10) mesh with gear 241 which is fixed to the bevel gear 244 of the speed leveling differential, wide faced gears 235 and 236 (Fig. 14) mesh with gear 261 which is journaled upon shaft 33, and gears 242 and 262 (Figs. 10 and 14) are both fixed upon shaft 243 and mesh, respectively, with gears 241 and 261 so that bevel gear 244 is rotated by motion transmitted thereto periodically from shafts 55, 91, 111 and 112.

Also as previously explained, wide faced gears 237 and 238 (Fig. 13) mesh with gear 249 which is fixed to the bevel gear 248 of the speed leveling differential, wide faced gears 233 and 234 (Fig. 9) mesh with gear 255 which is journaled upon shaft 33, and gears 252 and 254 (Figs. 13 and 9) are both fixed upon shaft 253 and mesh, respectively, with gears 249 and 255 so that bevel gear 248 is rotated by motion transmitted thereto periodically from shafts 92, 93, 113 and 114.

As previously explained, irregular shaped gear 132 (Fig. 16) will be driven at 900 R. P. M. in a counterclockwise direction through gears 36, 130 and 131 so that the irregular shaped gears 133 to 136 meshing with gear 132 will rotate shafts 111 to 114 in a clockwise direction at speeds which vary uniformly from 300 R. P. M. to 1500 R. P. M., and irregular shaped gear 142 (Fig. 7) will be driven at 900 R. P. M. in a counterclockwise direction through gears 35 and 46 (Fig. 6) and the speed adjusting differential 47-51 so that irregular shaped gears 143 to 146 meshing with gear 142 will rotate shafts 55, 91, 92 and 93 in a clockwise direction at speeds which vary uniformly from 300 R. P. M. to 1500 R. P. M. when input shaft 31 is rotating in a counterclockwise direction at 900 R. P. M. and the transmission is adjusted and the irregular shaped gears are designed as shown. Consequently, mutilated gears 151 to 158 and 161 to 168 fixed upon those shafts will be rotated in a clockwise direction at speeds which vary uniformly from 300 R. P. M. to 1500 R. P. M.

Since the mutilated gears, the wide faced gears and the gears through which motion is transmitted from the mutilated gears are all the same size and the ratio between those gears and gears 241 and 249 is 1:3, gears 241 and 249 will be driven at one-third the speed of a mutilated gear during the interval that mutilated gear is in mesh with its mating gear.

The periods during which motion is transmitted from the several mutilated gears to gears 241 and 249 will be designated herein as periods A, B, C, D, E, F, G and H.

At the instant represented in the drawings, which is the beginning of period A, gear 156 (Fig. 11) is being driven at 900 R. P. M. in a clockwise direction, is being accelerated and is just beginning to mesh with and drive gear 176. During period A, gear 156 will accelerate gear 176 from 900 R. P. M. to 1200 R. P. M. for one-sixth of a revolution and thereby drive bevel gear 244 (Fig. 10) in a counterclockwise direction and accelerate it from 300 R. P. M. to 400 R. P. M.

At the end of period A, gear 156 turns out of mesh with gear 176 and, at the same instant which is also the beginning of period B, gear 152 (Fig. 8) begins to mesh with and drive gear 172. During period B, gear 152 will accelerate gear 172 from 1200 R. P. M. to 1500 R. P. M. for one-sixth of a revolution and thereby accelerate bevel gear 244 from 400 R. P. M. to 500 R. P. M.

Bevel gear 244 is thus accelerated uniformly from 300 R. P. M. to 500 R. P. M. during periods A and B.

At the end of period B, gear 152 turns out of mesh with gear 172 and, at the same time instant which is also the beginning of period C, gear 166 (Fig. 15) begins to mesh with and drive gear 186. During period C, gear 166 will decelerate gear 186 from 1500 R. P. M. to 1200 R. P. M. for one-sixth of a revolution and thereby decelerate bevel gear 244 from 500 R. P. M. to 400 R. P. M.

At the end of period C, gear 166 turns out of mesh with gear 186 and, at the same instant which is also the beginning of period D, gear 162 (Fig. 12) begins to mesh with and drive gear 182. During period D, gear 162 will decelerate gear 182 from 1200 R. P. M. to 900 R. P. M. for one-sixth of a revolution and thereby decelerate bevel gear 244 from 400 R. P. M. to 300 R. P. M.

Bevel gear 244 is thus decelerated uniformly from 500 R. P. M. to 300 R. P. M. during periods C and D.

At the end of period D, gear 162 turns out of mesh with gear 182 and at the same instant, which is also the beginning of period E, gear 155 (Fig. 11) begins to mesh with and drive gear 175. During period E, gear 155 will accelerate gear 175 from 900 R. P. M. to 1200 R. P. M. for one-sixth of a revolution and thereby accelerate bevel gear 244 from 300 R. P. M. to 400 R. P. M.

At the end of period E, gear 155 turns out of mesh with gear 175 and at the same instant, which is also the beginning of period F, gear 151 (Fig. 8) begins to mesh with and drive gear 171. During period F, gear 151 will accelerate gear 171 from 1200 R. P. M. to 1500 R. P. M. for one-sixth of a revolution and thereby accelerate bevel gear 244 from 400 R. P. M. to 500 R. P. M.

Bevel gear 244 is thus accelerated uniformly from 300 R. P. M. to 500 R. P. M. during periods E and F.

At the end of period F, gear 151 turns out of mesh with gear 171 and at the same instant, which is also the beginning of period G, gear 165 (Fig. 15) begins to mesh with and drive gear 185. During period G, gear 165 will decelerate gear 185 from 1500 R. P. M. to 1200 R. P. M. for one-sixth of a revolution and thereby decelerate bevel gear 244 from 500 R. P. M. to 400 R. P. M.

At the end of period G, gear 165 turns out of mesh with gear 185 and at the same instant, which is also the beginning of period H, gear 161 (Fig. 12) begins to mesh with and drive gear 181. During period H, gear 161 will decelerate gear 181 from 1200 R. P. M. to 900 R. P. M. for one-sixth of a revolution and thereby decelerate bevel gear 244 from 400 R. P. M. to 300 R. P. M.

Bevel gear 244 is thus decelerated from 500 R. P. M. to 300 R. P. M. during periods G and H.

At the end of period H, gear 161 turns out of mesh with gear 181 and at the same instant, which is also the beginning of period A, gear 156 (Fig. 11) begins to mesh with and drive gear 176 and the above described cycle will be repeated.

At the beginning of period A, which is the instant represented in the drawings, gear 168 (Fig. 15) is being driven at 1500 R. P. M. in a clockwise direction, is being decelerated and is just beginning to mesh with and drive gear 188. During period A, gear 168 will decelerate gear 188 from 1500 R. P. M. to 1200 R. P. M. for one-sixth of a revolution and thereby drive bevel gear 248 (Fig. 13) in a counterclockwise direction and decelerate it from 500 R. P. M. to 400 R. P. M.

At the end of period A, gear 168 turns out of mesh with gear 188 and at the same instant, which is also the beginning of period B, gear 164 (Fig. 12) begins to mesh with and drive gear 184. During period B, gear 164 will decelerate gear 184 from 1200 R. P. M. to 900 R. P. M. for one-sixth of a revolution and thereby decelerate bevel gear 248 from 400 R. P. M. to 300 R. P. M.

Bevel gear 248 is thus decelerated uniformly from 500 R. P. M. to 300 R. P. M. during periods A and B.

At the end of period B, gear 164 turns out of mesh with gear 184 and at the same instant, which is also the beginning of period C, gear 157 (Fig. 11) begins to mesh with and drive gear 177. During period C, gear 157 will accelerate gear 177 from 900 R. P. M. to 1200 R. P. M. for one-sixth of a revolution and thereby accelerate bevel gear 248 from 300 R. P. M. to 400 R. P. M.

At the end of period C, gear 157 turns out of mesh with gear 177 and at the same instant, which is also the beginning of period D, gear 153 (Fig. 8) begins to mesh with and drive gear 173. During period D, gear 153 will accelerate gear 173 from 1200 R. P. M. to 1500 R. P. M. for one-sixth of a revolution and thereby accelerate bevel gear 248 from 400 R. P. M. to 500 R. P. M.

Bevel gear 248 is thus accelerated from 300 R. P. M. to 500 R. P. M. during periods C and D.

At the end of period D, gear 153 turns out of mesh with gear 173 and at the same instant, which is also the beginning of period E, gear 167 (Fig. 15) begins to mesh with and drive gear 187. During period E, gear 167 will decelerate gear 187 from 1500 R. P. M. to 1200 R. P. M. for one-sixth of a revolution and thereby decelerate bevel gear 248 from 500 R. P. M. to 400 R. P. M.

At the end of period E, gear 167 turns out of mesh with gear 187 and at the same instant, which is also the beginning of period F, gear 163 (Fig. 12) begins to mesh with and drive gear 183. During period F, gear 163 will decelerate gear 183 from 1200 R. P. M. to 900 R. P. M. for one-sixth of a revolution and thereby decelerate bevel gear 248 from 400 R. P. M. to 300 R. P. M.

Bevel gear 248 is thus decelerated uniformly from 500 R. P. M. to 300 R. P. M. during periods E and F.

At the end of period F, gear 163 turns out of mesh with gear 183 and at the same instant, which is also the beginning of period G, gear 158 (Fig. 11) begins to mesh with and drive gear 178. During period G, gear 158 will accelerate gear 178 from 900 R. P. M. to 1200 R. P. M. for one-sixth of a revolution and thereby accelerate bevel gear 248 from 300 R. P. M. to 400 R. P. M.

At the end of period G, gear 158 turns out of mesh with gear 178 and at the same instant, which is also the beginning of period H, gear 154 (Fig. 8) begins to mesh with and drive gear 174. During period H, gear 154 will accelerate gear 174 from 1200 R. P. M. to 1500 R. P. M. for one-sixth of a revolution and thereby accelerate bevel gear 248 from 400 R. P. M. to 500 R. P. M.

Bevel gear 248 is thus accelerated from 300 R. P. M. to 500 R. P. M. during periods G and H.

At the end of period H, gear 154 will turn out of mesh with gear 174 and at the same instant, which is also the beginning of period A, gear 168 (Fig. 15) will begin to mesh with and drive gear 188 and the above described cycle will be repeated.

Bevel gear 244 (Figs. 2 and 10), which constitutes one input leg of the speed leveling differential, is thus driven in a counterclockwise direction and uniformly accelerated from 300 R. P. M. to 500 R. P. M. at the same time (during each of double periods A—B and E—F) that bevel gear 248 (Figs. 2 and 12), which constitutes the other input leg of the speed leveling differential, is being driven in a counterclockwise direction and uniformly decelerated from 500 R. P. M. to 300 R. P. M., and it is uniformly decelerated from 500 R. P. M. to 300 R. P. M. at the same time (during each of double periods C—D and G—H) that bevel gear 248 is being accelerated uniformly from 300 R. P. M. to 500 R. P. M.

Consequently, the sum of the speeds of bevel gears 244 and 248 will equal 800 at each and every instant so that the speed of the third or output leg of the speed leveling differential (consisting of spider pinions 245 and 246, spider 247 and shaft 33) will be driven in a counterclockwise direction at a constant speed of 400 R. P. M. (one-half the sum of the speeds of the two input legs).

Bevel gear 39 (Figs. 2 and 5), which constitutes one input leg of the reversing differential and is fixed upon shaft 33, is thus driven in a counterclockwise direction at a constant speed of 400 R. P. M. and, since bevel gear 38 (Figs. 1 and 2) which constitutes the other input leg of the reversing differential, is driven in a clockwise direction at a constant speed of 300 R. P. M. as previously explained, output shaft 32, which forms a part of the third or output leg of the reversing differential, is driven in a counterclockwise direction at a constant speed of 50 R. P. M. (one-half the difference between the speeds of bevel gears 38 and 39).

The speed and/or the direction of rotation of output shaft 32 may be varied by varying the speeds at which the two input legs of the speed leveling differential 244–248 (Figs. 2, 10 and 12) are driven. This is accomplished by causing motion to be transmitted thereto from different sectors of irregular shaped gears 143 to 146 (Fig. 7) and 133 to 136 (Fig. 16).

As previously explained, irregular shaped gear 142 (Fig. 7) meshes with irregular shaped gears 143, 144, 145 and 146 which are fixed, respectively, upon shafts 55, 91, 92 and 93, and irregular shaped gear 132 (Fig. 16) meshes with irregular shaped gears 133, 134, 135 and 136 which are fixed, respectively, upon shafts 111, 112, 113 and 114.

Gears 142 and 132 are rotated in a counterclockwise direction at a constant speed of 900 R. P. M. and drive, respectively, irregular shaped gears 143 to 146 and 133 to 136 and shafts 55, 91 to 93 and 111 to 114 in a clockwise direction at speeds which vary uniformly between 300 R. P. M. and 1500 R. P. M.

When the transmission is adjusted as shown, motion is transmitted to the input legs of speed leveling differential 244–248 from shafts 55, 91 to 93 and 111 to 114 only when the shaft from which motion is being transmitted is having its speed varied between 900 R. P. M. and 1200 R. P. M. or between 1200 R. P. M. and 1500 R. P. M., and no motion is transmitted to an input leg of differential 244–248 from any one of the above shafts when the speed of that shaft is being varied between 300 R. P. M. and 900 R. P. M.

Therefore, if the transmission is so adjusted that motion is transmitted to the input legs of differential 244–248 only when the above shafts are rotating at speeds which vary uniformly between a minimum speed which is less than 900 R. P. M. and a maximum speed which is less than 1500 R. P. M., the speeds of the input legs of differential 244–248 will be reduced accordingly with a resultant variation in the speed or direction of rotation of output shaft 32.

If the transmission is so adjusted that motion is transmitted to the input legs of differential 244–248 only when shafts 55, 91 to 93 and 111 to 114 are rotating at speeds which vary between 600 R. P. M. and 1200 R. P. M., the input legs of differential 244–248 will be rotated at speeds which vary between 200 R. P. M. and 400 R. P. M. so that the output leg of differential 244–248 and bevel gear 39 (Fig. 2) of the reversing differential will be rotated at a constant speed of 300 R. P. M. Consequently, the speed of output shaft 32 will be reduced to zero for the reason that bevel gear 38 of the reversing differential is rotating at the same speed as bevel gear 39 but in the opposite direction.

If the transmission is so adjusted that motion is transmitted to the input legs of differential 244–248 only when shafts 55, 91 to 93 and 111 to 114 are rotating at speeds which vary between 300 R. P. M. and 900 R. P. M., the input legs of differential 244–248 will be rotated at speeds which vary between 100 R. P. M. and 300 R. P. M. so that the output leg of differential 244–248 and bevel gear 39 of the reversing differential will be rotated at a constant speed of 200 R. P. M. Consequently, output shaft 32 will be rotated at its former speed of 50 R. P. M. but in the opposite direction for the reason that the speed of bevel gear 39 will then be 100 R. P. M. less than the speed of bevel gear 38.

It has previously been pointed out that each of the irregular shaped driven gears 143 to 146 (Fig. 7) and 133 to 136 (Fig. 16) makes a complete revolution during each complete revolution of the irregular shaped driving gear 142 or 132 with which it meshes, that it is accelerated from 300 R. P. M. to 1500 R. P. M. during one half-revolution and decelerated from 1500 R. P. M. to 300 R. P. M. during the other half-revolution, and that it makes one-third of a revolution during the time its speed is being varied between 900 R. P. M. and 1500 R. P. M. which is the upper half of its speed range.

Therefore, each irregular shaped driven gear will be rotated through 120° and have its speed varied between 900 R. P. M. and 1500 R. P. M. during each of two quarter-revolutions of the driving gear 142 or 132 meshing therewith, and it will be rotated through 60° and have its speed varied between 300 R. P. M. and 900 R. P. M. during each of the other two quarter-revolutions of the driving gear.

It has also been previously pointed out that each of shafts 55, 91 to 93 and 111 to 114 has two mutilated gears and an irregular shaped driven gear fixed thereon and a wide faced gear journaled thereon, that when the transmission is adjusted as shown, the mutilated gears mesh with their mating gears and rotate the wide-faced gear only when the speed of the shaft is being varied between 900 R. P. M. and 1200 R. P. M. or between 1200 R. P. M. and 1500 R. P. M. and that one mutilated gear rotates the wide-faced gear during one-sixth of a revolution of the shaft and then it turns out of mesh with its mating gear and the other mutilated gear on the same shaft rotates the wide-faced gear during the next sixth-revolution of the shaft, thereby causing the wide-faced gear to be rotated continuously during one-third of a revolution of the shaft.

Therefore, by delaying the time when the mutilated gears turn into mesh with their mating gears and thereby causing motion to be transmitted to the input legs of differential 244-248 from slower speed sectors of the irregular shaped gears, the speed of output shaft 32 will be reduced. This is accomplished by each gear which meshes with a mutilated gear being revolved around that mutilated gear relative to a given point upon the pitch line of the irregular shaped gear which is fixed upon the same shaft as that mutilated gear.

Figure 1:
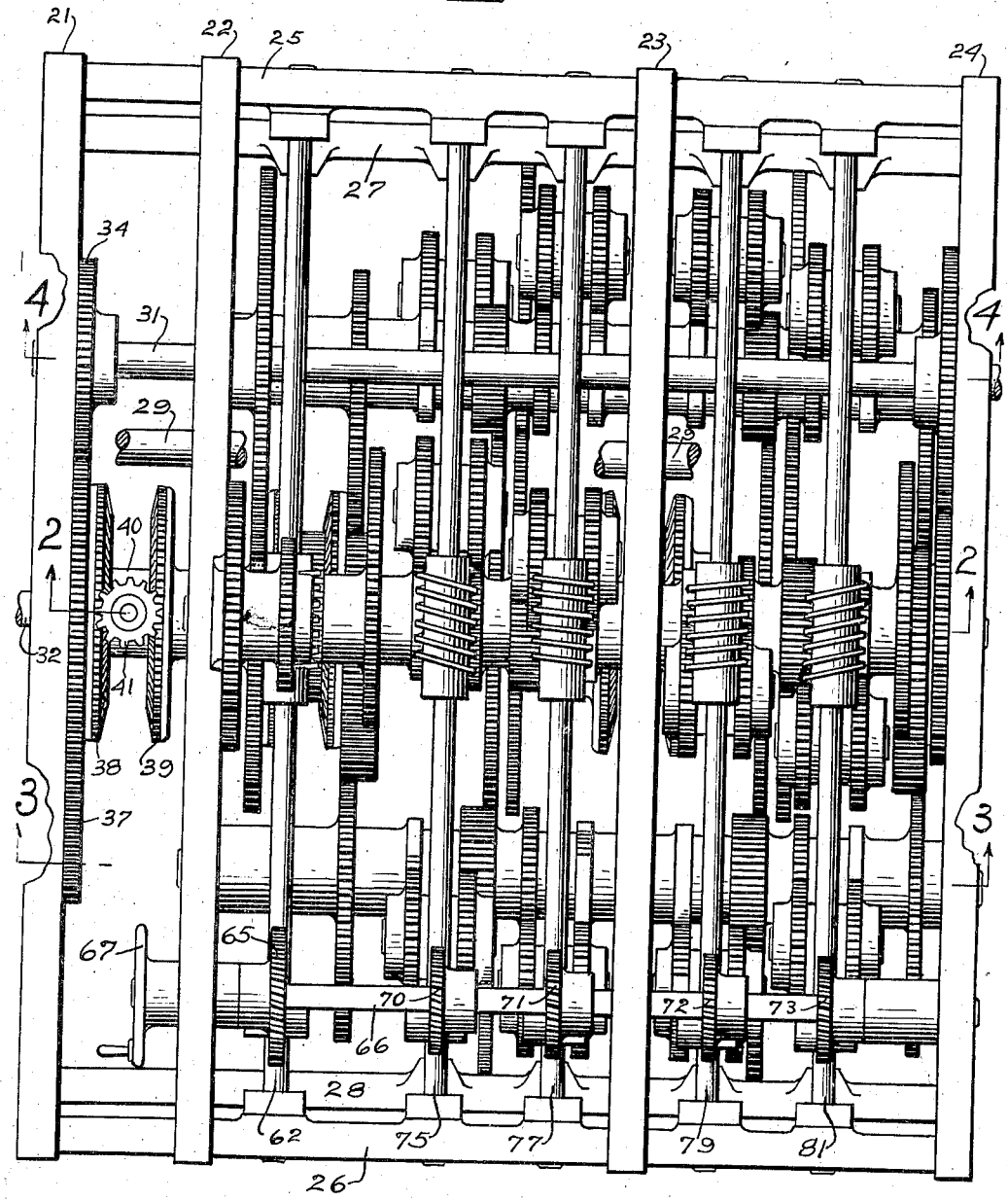
Fig. 1 is a top plan view of the transmission.

The gears which mesh with the mutilated gears are revolved about the mutilated gears by turning hand wheel 67 (Fig. 1). If the speed of output shaft is to be reduced, hand wheel 67 is turned in a clockwise direction, thereby rotating shaft 66 and the spiral gears 70, 71, 72 and 73 fixed thereon.

Spiral gear 70 (Fig. 9), through spiral gear 74, shaft 75 and worm 85, rotates ring gear 86 in a counterclockwise direction. Ring gear 86 swings gear segments 87, 88, 89 and 90 in a counterclockwise direction upon shafts 55, 91, 92 and 93, respectively, and thereby swings gears 195, 196, 197 and 198 (Fig. 9) and gears 171, 172, 173 and 174 (Fig. 8) around mutilated gears 151, 152, 153 and 154, respectively.

Spiral gear 71 (Fig. 11), through spiral gear 76, shaft 77 and worm 95, rotates ring gear 96 in a counterclockwise direction. Ring gear 96 swings gear segments 97, 98, 99 and 100 in a counterclockwise direction upon shafts 55, 91, 92 and 93, respectively, and thereby swings gears 175, 176, 177 and 178 (Fig. 11) and gears 205, 206, 207 and 208 (Fig. 10) around mutilated gears 155, 156, 157 and 158 (Fig. 11) respectively.

Spiral gear 72 (Fig. 13), through spiral gear 78, shaft 79 and worm 105, rotates ring gear 106 in a clockwise direction. Ring gear 106 swings gear segments 107, 108, 109 and 110 in a clockwise direction upon shafts 111, 112, 113 and 114, respectively, and thereby swings gears 215, 216, 217 and 218 (Fig. 13) and gears 181, 182, 183 and 184 (Fig. 12) around mutilated gears 161, 162, 163 and 164 respectively.

Spiral gear 73 (Fig. 15), through spiral gear 80, shaft 81 and worm 120, rotates ring gear 121 in a clockwise direction. Ring gear 121 swings gear segments 122, 123, 124 and 125 in a clockwise direction upon shafts 111, 112, 113 and 114, respectively, and thereby swings gears 185, 186, 187 and 188 (Fig. 15) and gears 225, 226, 227 and 228 (Fig. 14) around mutilated gears 165, 166, 167 and 168 (Fig. 15) respectively.

The farther the above gears are swung around the mutilated gears, the later the mutilated gears will mesh therewith.

Since the two mutilated gears on each of shafts 55, 91 to 93 and 111 to 114 together transmit motion during one-third of a revolution of that shaft when the transmission is adjusted as shown and motion is transmitted from each shaft only when its speed is being varied between 900 R. P. M. and 1500 R. P. M., and since each of the above shafts turns through only 60° during the time its speed is being varied between 300 R. P. M. and 900 R. P. M., it follows that as the transmission is adjusted to progressively reduce its output speed, the two mutilated gears on each of the above shafts must mesh with their mating gears during progressively smaller parts of each revolution of the shaft upon which those two mutilated gears are fixed.

This is accomplished by making the gear ratios between adjusting shaft 66 and the ring gears such that two of the ring gears are rotated twice as fast as the other two ring gears are rotated.

As shown, ring gear 86 (Fig. 9) is rotated by worm 85 through twice as many degrees per revolution of hand wheel 67 as ring gear 96 (Fig. 11) is rotated by worm 95 per revolution of hand wheel 67, and ring gear 121 (Fig. 15) is rotated by worm 120 through twice as many degrees per revolution of hand wheel 67 as ring gear 106 (Fig. 13) is rotated by worm 105 per revolution of hand wheel 67.

If hand wheel 67 is rotated to the limit of its movement in a clockwise direction, ring gear 96 (Fig. 11) will rotate gear segments 97, 98, 99 and 100 from the positions shown through 60° in a counterclockwise direction, ring gear 86 (Fig. 9) will rotate gear segments 87, 88, 89, and 90 from the positions shown through 120° in a counterclockwise direction, ring gear 106 (Fig. 13) will rotate gear segments 107, 108, 109 and 110 from the positions shown through 60° in a clockwise direction, and ring gear 121 (Fig. 15) will rotate gear segments 122, 123, 124 and 125 from the positions shown through 120° in a clockwise direction. It is to be understood that suitable stops (not shown) are provided for preventing the gear segments from turning beyond their prescribed ranges.

Figure 13:
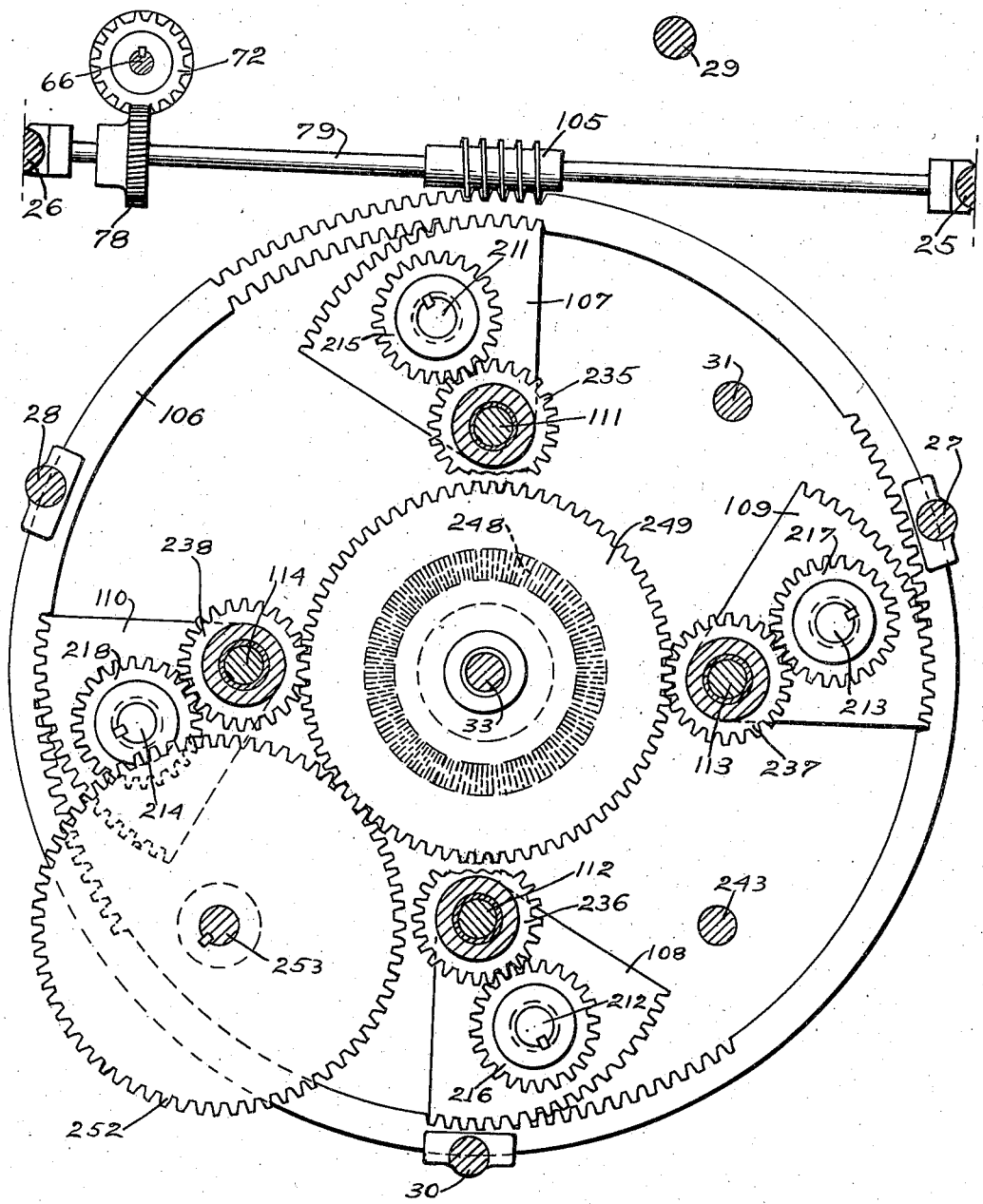
Fig. 13 is a vertical section taken on the line 13—13 of Fig. 2.
Figure 14:
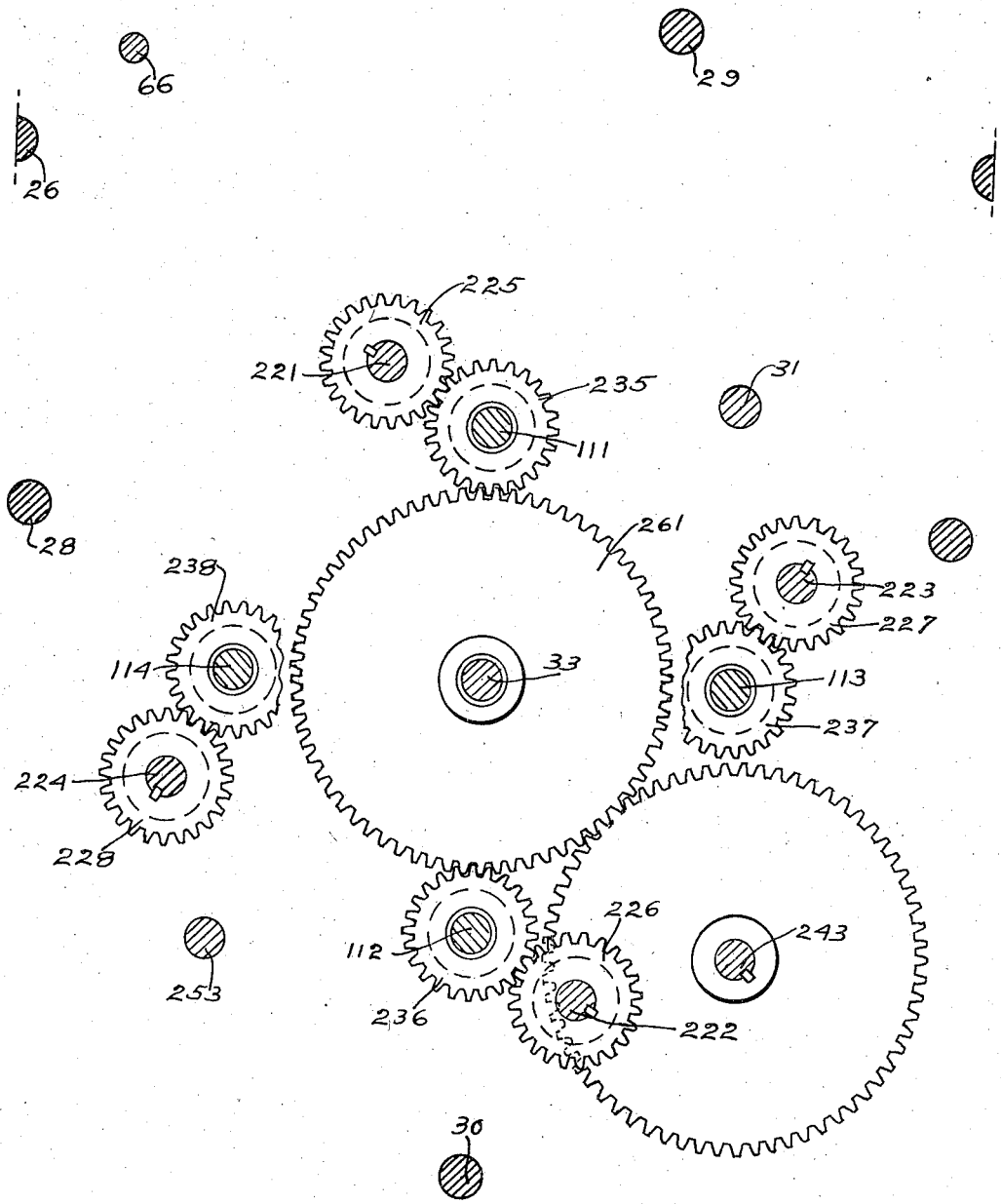
Fig. 14 is a vertical section taken on the line 14—14 of Fig. 2.

When the transmission is adjusted as shown, the gears carried by gear segments 87, 88, 89 and 90 (Fig. 9), that is the gears fixed upon the shafts journaled in those segments, are displaced 60° from the gears carried by gear segments 97, 98, 99 and 100 (Fig. 11), and the gears carried by gear segments 122, 123, 124 and 125 (Fig. 15) are displaced 60° from the gears carried by gear segments 107, 108, 109 and 110 (Fig. 13).

Therefore, when gear segments 87, 88, 89 and 90 (Fig. 9) are rotated through 120° and gear segments 97, 98, 99 and 100 (Fig. 11) are rotated through 60°, the gears carried by gear segments 87, 88, 89 and 90 will be in alinement, respectively, with the gears carried by gear segments 97, 98, 99 and 100 so that the two mutilated gears on each of shafts 55, 91, 92 and 93 will mesh simultaneously with the gears carried by the gear segment journaled upon that shaft and will transmit motion to an input leg of differential 244–248 during only one-sixth of a revolution of that shaft.

Likewise, when gear segments 107, 108, 109 and 110 (Fig. 13) are rotated through 60° and gear segments 122, 123, 124 and 125 (Fig. 15) are rotated through 120°, the gears carried by gear segments 107, 108, 109 and 110 will be in alinement, respectively, with the gears carried by gear segments 122, 123, 124 and 125 so that the two mutilated gears on each of shafts 111, 112, 113 and 114 will mesh simultaneously with the gears carried by the gear segment journaled upon that shaft and will transmit motion to an input leg of differential 244–248 during only one-sixth of a revolution of that shaft.

Figure 15:
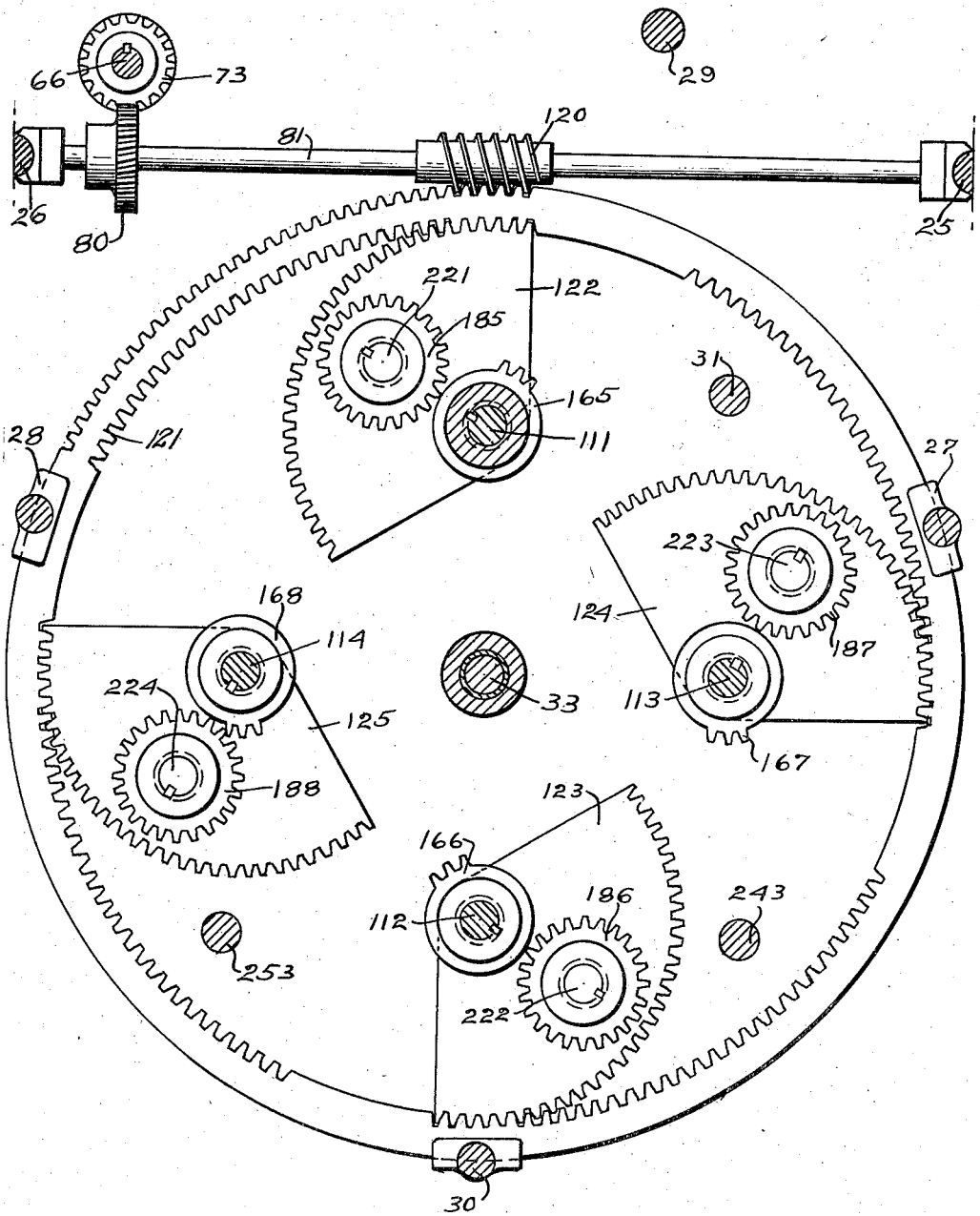
Fig. 15 is a vertical section taken on the line 15—15 of Fig. 2.

When the gear segments shown in Fig. 15 have been rotated through 120° and the gear segments shown in Fig. 13 have been rotated through 60° so that the two mutilated gears on each of shafts 111, 112, 113 and 114 mesh during only one-sixth of a revolution with the two gears carried by one of those gear segments as explained above, the gears carried by each of the gear segments shown in Figs. 13 and 15 will have been moved to such positions that their mating mutilated gears will mesh therewith only during the time that the shaft upon which those two mutilated gears are fixed is having its speed varied between 300 R. P. M. and 900 R. P. M.

Therefore, when hand wheel 67 is rotated in a clockwise direction until the gear segments are rotated to the limits of their movements as explained above, each of shafts 111, 112, 113 and 114 will transmit motion to an input leg of differential 244–248 during only one-sixth of each of its revolutions and only during the time its speed is being varied between 300 R. P. M. and 900 R. P. M.

In order that the two mutilated gears on each of shafts 55, 91, 92 and 93 shall mesh with their mating gears only during the time that the shaft upon which those two mutilated gears are fixed is having its speed varied between 300 R. P. M. and 900 R. P. M. and in order that one input leg of differential 244–248 may be accelerated at the same time, at the same rate and through the same range that the other input leg of differential 244–248 is being decelerated, it is necessary that the mutilated gears on shafts 55, 91, 92 and 93 be rotated relative to the mutilated gears on shafts 111, 112, 113 and 114.

If the parts are in the positions shown and are stationary and hand wheel 67 is rotated in a clockwise direction to the limit of its movement, that is to adjust the speed of output shaft 32 from 50 R. P. M. in a counterclockwise direction to 50 R. P. M. in a clockwise direction, the mutilated gears on shafts 55, 91, 92 and 93 will be rotated through 180° in a counterclockwise direction in a manner to be presently explained.

If an output speed less than the maximum output speed is desired, the mutilated gears on shafts 55, 91, 92 and 93 must be rotated relative to the mutilated gears on shafts 111, 112, 113 and 114 through an angular distance which bears the same ratio to the maximum angular movement of those mutilated gears that the angular distance through which each of the gear segments is moved bears to the maximum angular movement of that segment.

Figure 6:
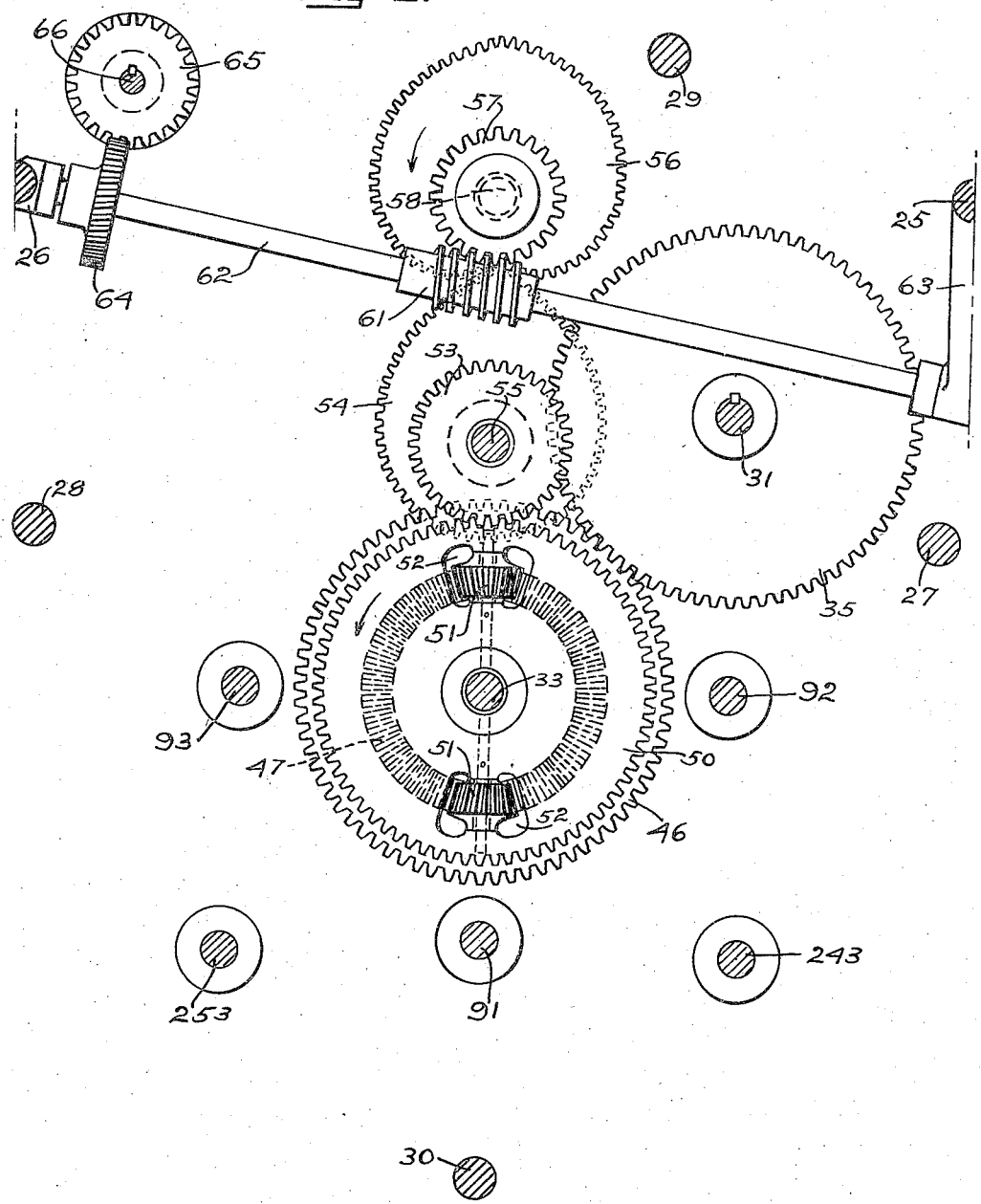
Fig. 6 is a vertical section taken on the line 6—6 of Fig. 2.
Figure 7:
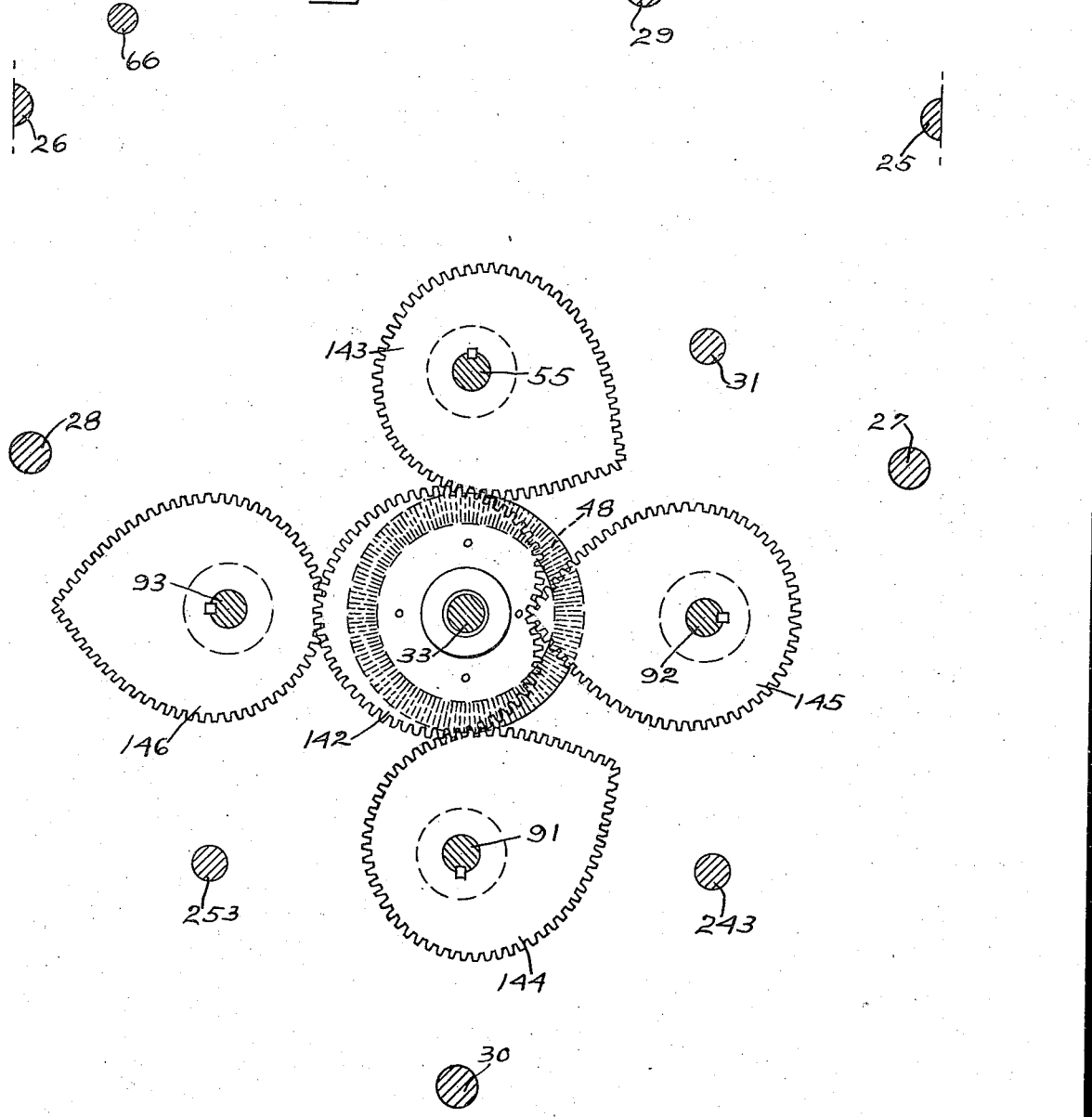
Fig. 7 is a vertical section taken on the line 7—7 of Fig. 2.
Figure 8:
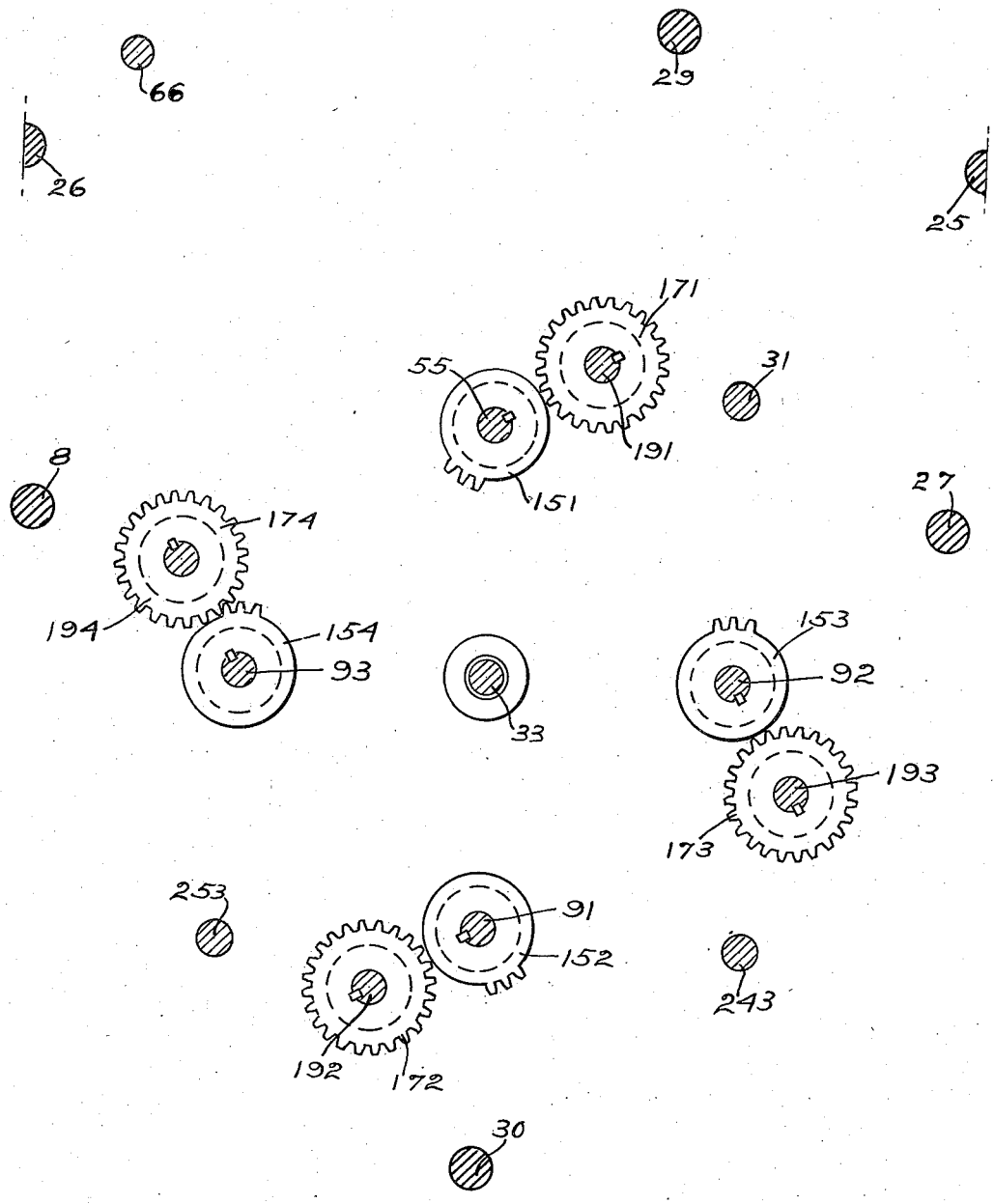
Fig. 8 is a vertical section taken on the line 8—8 of Fig. 2.

The mutilated gears on shafts 55, 91, 92 and 93 are rotated relative to the mutilated gears on shafts 111, 112, 113 and 114 by means of the mechanism shown primarily in Fig. 6.

When hand wheel 67 is rotated to rotate the gear segments as previously explained, shaft 66 (Fig. 1) will rotate shaft 62 (Fig. 6) through spiral gears 64 and 65. Shaft 62, through worm 61, worm wheel 57, shaft 58, irregular shaped gears 56 and 54 and gear 53 will rotate differential gear 50 and thereby rotate bevel gear 48 in a clockwise direction. Since irregular shaped gear 142 (Figs. 2 and 7) is fixed to bevel gear 48, it will be rotated with it in a clockwise direction and rotate irregular shaped gears 143, 144, 145 and 146 in a counterclockwise direction and thereby rotate shafts 55, 91, 92 and 93 and the mutilated gears thereon in a counterclockwise direction.

If hand wheel 67 is rotated from one to the other of its limits, irregular shaped gear 142 will be rotated 180° from the position it would have occupied had hand wheel 67 not been rotated. That is, if the several parts of the transmission are in the positions shown, rotation of hand wheel 67 through its entire range will cause irregular shaped gear 142 to be rotated 180° in a clockwise direction from the position shown in the drawings, thereby rotating the mutilated gears on shafts 55, 91, 92 and 93 through 180° relative to the mutilated gears on shafts 111, 112, 113 and 114.

Irregular shaped gear 56 (Fig. 6) is exactly like irregular shaped gear 142 (Fig. 7) and irregular shaped gear 54 (Fig. 6) is exactly like each of irregular shaped gears 143, 144, 145 and 146.

When hand wheel 67 is rotated to rotate shaft 66 and thereby shift the several parts from the positions shown in the drawings, irregular shaped gear 142 (Fig. 7) is driven through gears 48, 50 and 51 (Fig. 6) by irregular shaped gears 54 and 56 at an increasing angular velocity relative to the speed of shaft 66.

Since gear 142 is like gear 56 and since each of gears 143, 144, 145 and 146 is like gear 54, gear 142 will drive each of gears 143, 144, 145 and 146 at a speed which is proportional to the speed of shaft 66. This arrangement is necessary for the reason that the gear segments are rotated at speeds which are proportional to the speed of shaft 66. Otherwise the transmission could not be adjusted to intermediate speeds.

Figure 9:
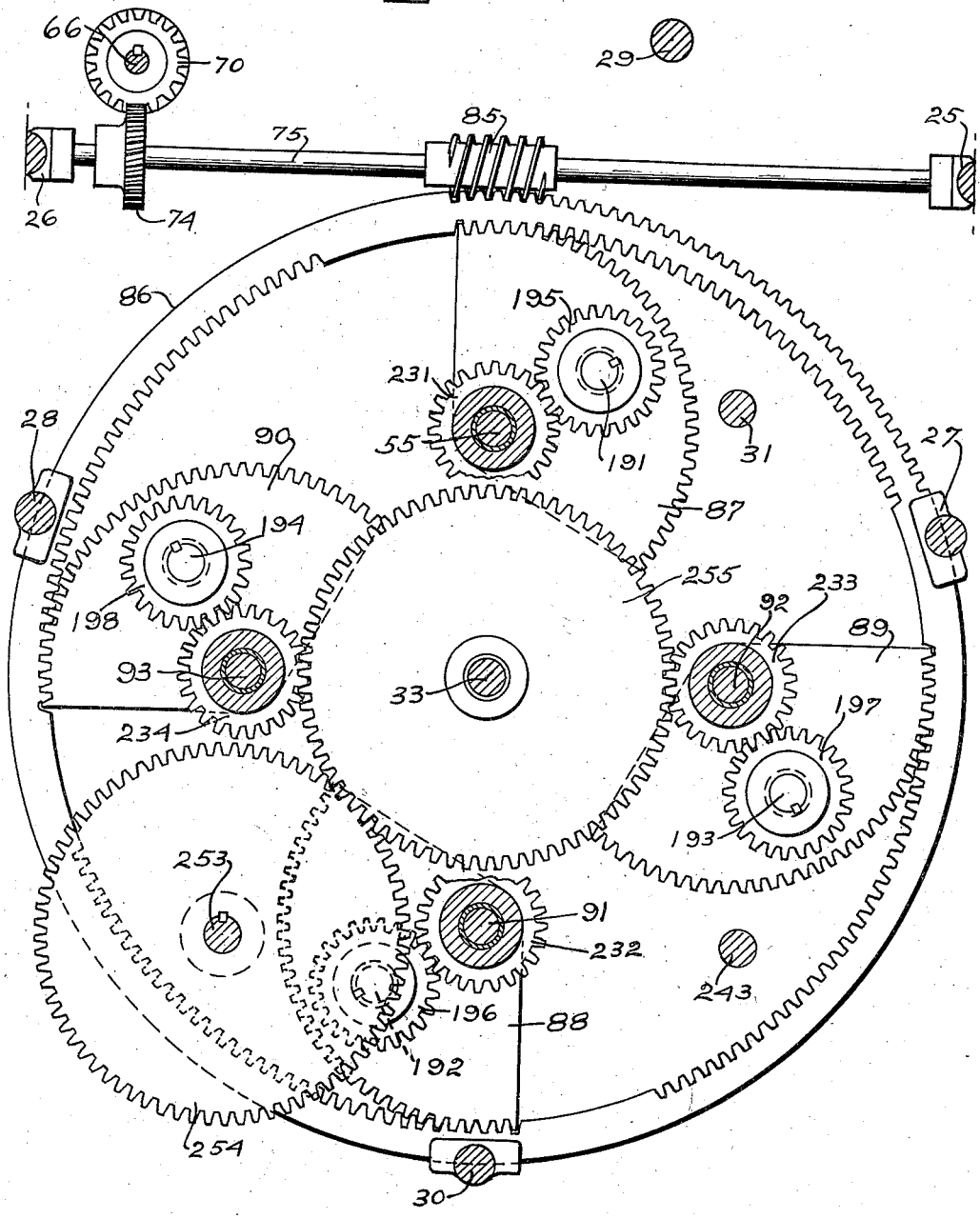
Fig. 9 is a vertical section taken on the line 9—9 of Fig. 2.
Figure 10:
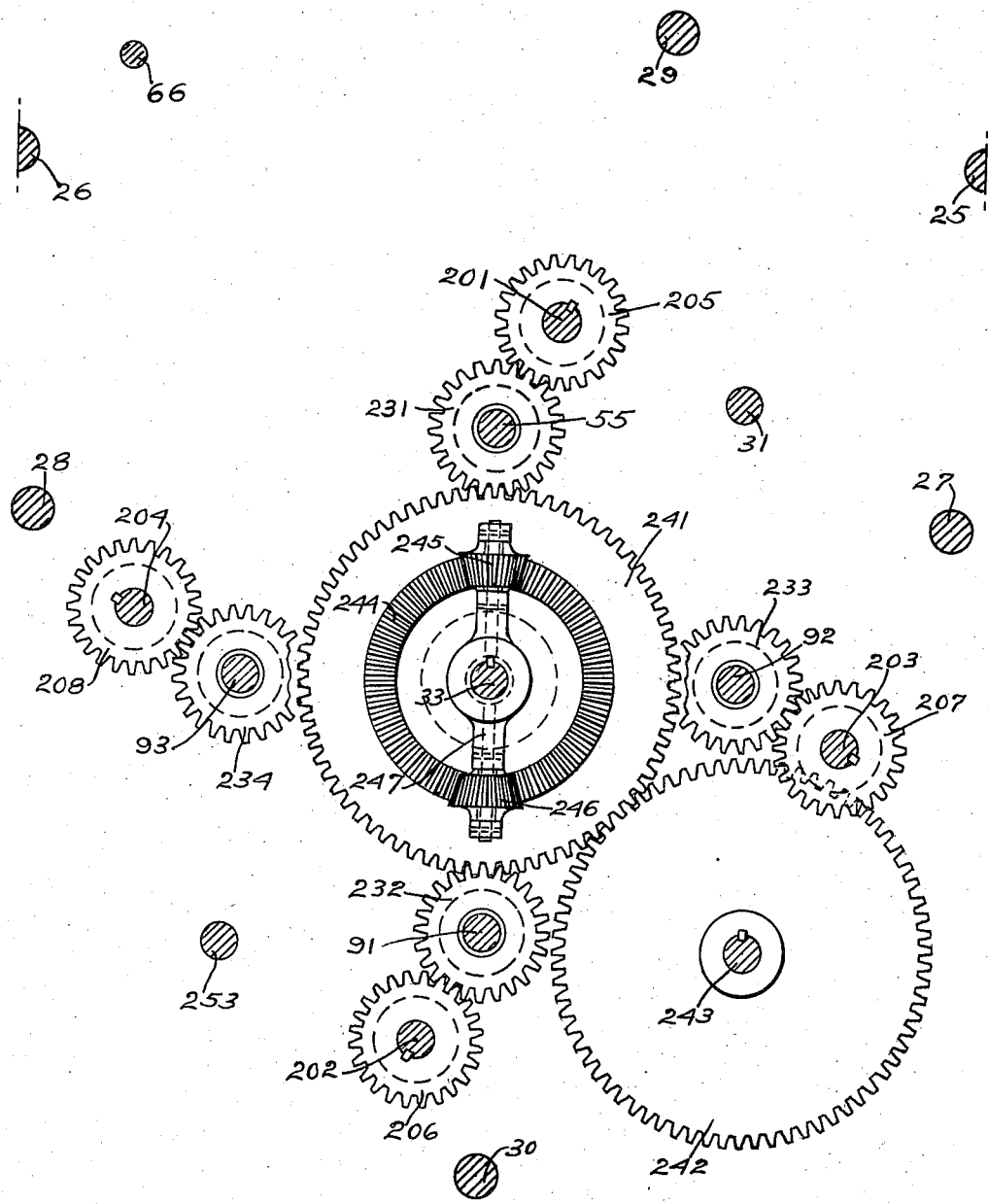
Fig. 10 is a vertical section taken on the line 10—10 of Fig. 2.
Figure 11:
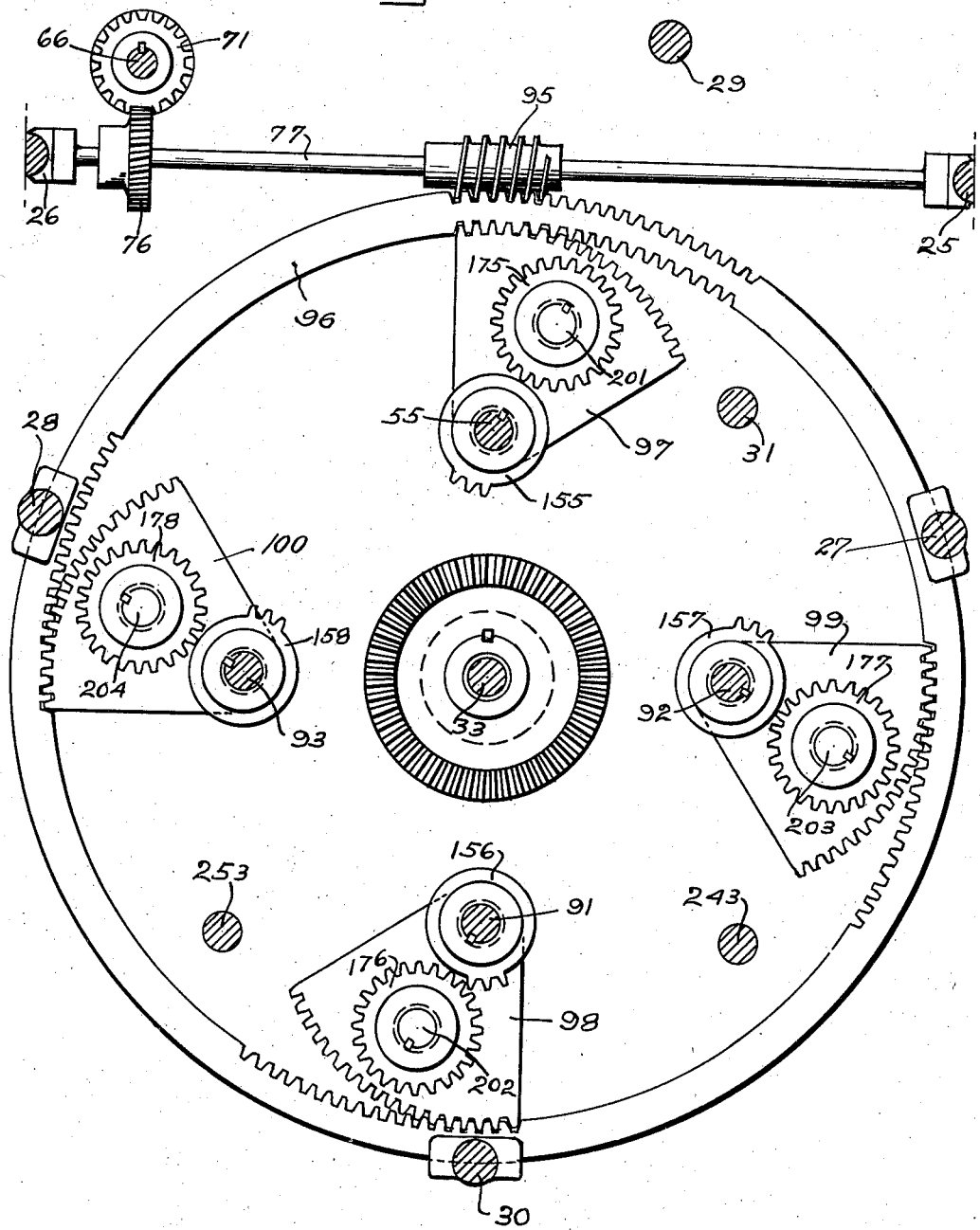
Fig. 11 is a vertical section taken on the line 11—11 of Fig. 2.
Figure 12:
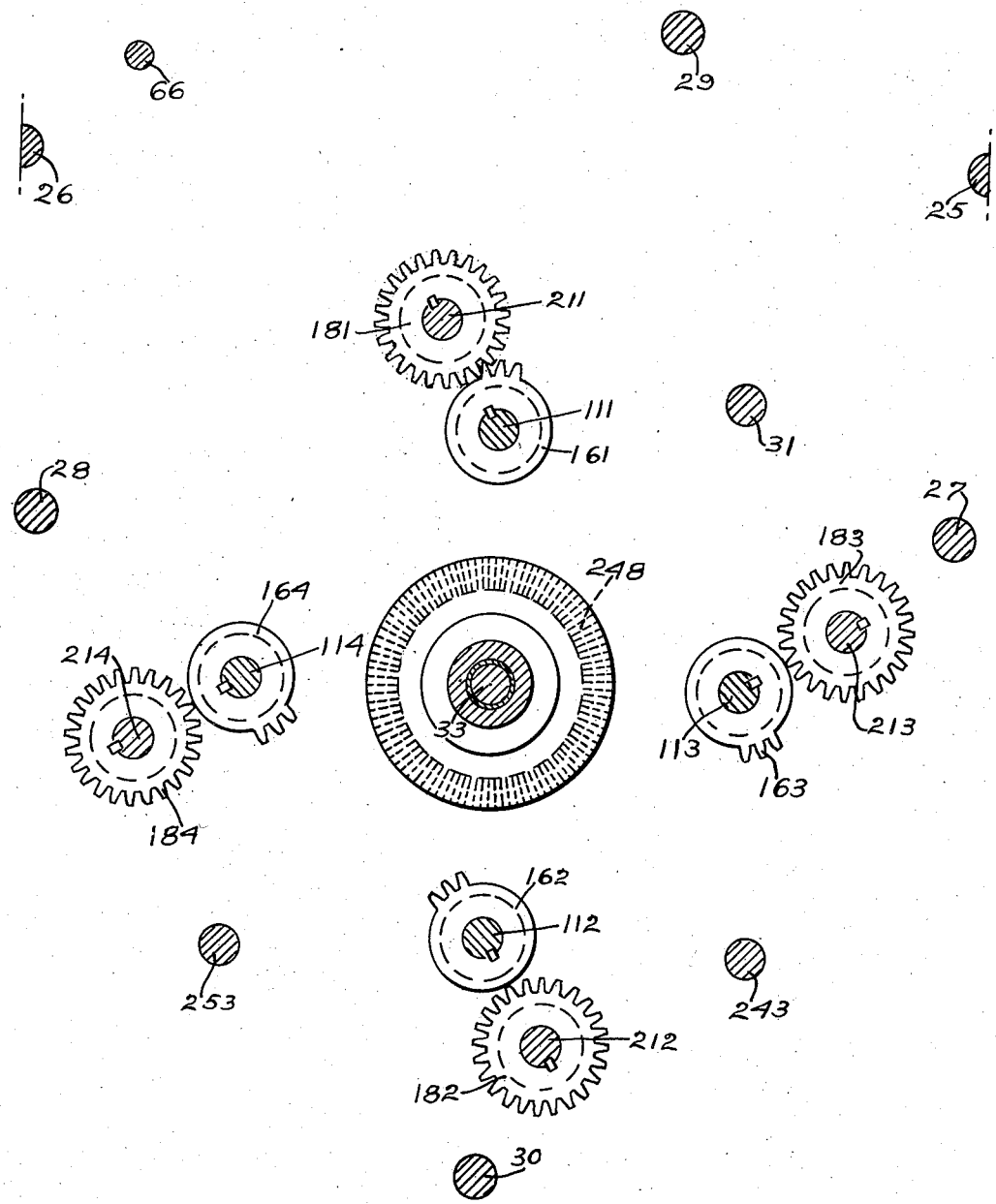
Fig. 12 is a vertical section taken on the line 12—12 of Fig. 2.

When the gear segments shown in Figs. 9 and 11 have been rotated in a counterclockwise direction through 120° and 60° respectively, and the gear segments shown in Figs. 13 and 15 have been rotated in a clockwise direction through 60° and 120°, respectively, so that the two mutilated gears on each of shafts 55, 91 to 93 and 111 to 114 mesh during only one-sixth of a revolution with the two gears carried by one of the gear segments, and when the mutilated gears on shafts 55, 91, 92 and 93 have been rotated through 180° in a counterclockwise direction from the positions shown in the drawings, as explained above, the mutilated gears on each of shafts 55, 91 to 93 and 111 to 114 will mesh with their mating gears only during the time the shaft upon which the meshing mutilated gears are fixed is having its speed varied between 300 R. P. M. and 900 R. P. M. and that shaft will transmit motion during only one-sixth of each of its revolutions to an input leg of differential 244–248.

Since the ratio between the mutilated gears and bevel gears 244 and 248 (Figs. 2, 10 and 12) is 1:3, bevel gears 244 and 248 (which constitute the two input legs of speed leveling differential 244–248) will be driven at speeds which vary uniformly between 100 R. P. M. and 300 R. P. M.

When the transmission has been adjusted as explained above, one input leg of differential 244–248 will be accelerated from 100 R. P. M. to 300 R. P. M. during exactly the same time that the other input leg is being decelerated from 300 R. P. M. to 100 R. P. M. so that shaft 33 will be rotated at a constant speed of 200 R. P. M.

Since bevel gear 39 (Fig. 2) is fixed upon shaft 33, it will be rotated therewith in a counterclockwise direction at a constant speed of 200 R. P. M., and since bevel gear 38 is continuously rotated in a clockwise direction at a constant speed of 300 R. P. M., output shaft 32 will be rotated at a constant speed of 50 R. P. M. (one-half the difference between the speeds of gears 38 and 39) in a clockwise direction which is opposite to the direction in which it is rotated when the transmission is adjusted as shown in the drawings.

Since output shaft 32 will be rotated at its maximum speed in a counterclockwise direction when the transmission is adjusted as shown in the drawings and since it will be rotated at its maximum speed in a clockwise direction when hand wheel 67 has been rotated through its entire range so that the gear segments shown in Figs. 9 and 15 have been rotated 120° from the positions shown and the gear segments shown in Figs. 11 and 13 have been rotated 60° from the positions shown, it is obvious that the speed of output shaft 32 will be zero when the transmission is so adjusted that each of the gear segments is arranged at the midpoint of its total movement, that is, when the gear segments shown in Figs. 9 and 15 have been rotated 60° from the positions shown and the gear segments shown in Figs. 11 and 13 have been rotated 30° from the positions shown.

From the foregoing, it will be obvious that the speed of output shaft 32 in one direction or the other will be proportional to the angular distances the gear segments are offset in one direction or the other from their midpoint positions, and that the speed of output shaft 32 may be varied uniformly and steplessly from zero to maximum in either direction of rotation.

The invention herein set forth is susceptible of various modifications without departing from the scope thereof as hereafter claimed.

The invention is hereby claimed as follows:

1. A variable speed transmission, comprising an input shaft for connection to a power source to be driven therefrom, an output shaft, a positive drive of the toothed wheel type for transmitting motion from said input shaft to said output shaft, said drive including intermeshing irregular shaped gears, and means for adjusting said drive to vary the speed of said output shaft steplessly between zero and a maximum speed.

2. A variable speed transmission, comprising an input shaft for connection to a power source to be driven therefrom, an output shaft, a three-legged differential gear having a first leg connected to said output shaft to drive the same and a second leg driven by said input shaft at a speed proportional to the speed thereof, a positive drive of the toothed wheel type for driving the third leg of said differential from said input shaft, said drive including intermeshing irregular shaped gears, and means for adjusting said drive to gradually and steplessly vary the ratio between said input shaft and said third leg to thereby vary the speed of said output shaft.

3. A variable speed transmission, comprising an input shaft for connection to a power source to be driven therefrom, an output shaft, a positive drive of the toothed wheel type for transmitting motion from said input shaft to said output shaft, said drive including intermeshing irregular shaped gears, and means for adjusting said drive to vary the speed of said output shaft between zero and a maximum speed uniformly and steplessly in either direction of rotation.

4. A variable speed transmission, comprising an input shaft for connection to a power source to be driven therefrom, an output shaft, a three-legged differential gear having a first leg connected to said output shaft to drive the same and a second leg driven by said input shaft at a speed proportional to the speed thereof, a positive drive of the toothed wheel type for driving the third leg of said differential from said input shaft, said drive including intermeshing irregular shaped gears, and means for adjusting said drive to gradually and steplessly vary the ratio between said input shaft and said third leg through a sufficiently wide range to vary the speed of said output shaft between zero and a maximum speed in either direction of rotation.

5. A variable speed transmission, comprising an input shaft for connection to a power source to be driven therefrom, an output shaft, a three-legged differential gear having a first leg connected to said output shaft to drive the same and a second leg driven in one direction from said input shaft at a speed proportional to the speed thereof, a positive drive of the toothed wheel type for driving the third leg of said differential in the opposite direction from said input shaft, said drive including intermeshing irregular shaped gears, and means for adjusting said drive to gradually and steplessly vary the speed of said third leg between a speed equal to the speed of said second leg and either a higher or a lower speed to thereby vary the speed of said output shaft steplessly between zero and a maximum speed in either direction of rotation.

6. A variable speed transmission, comprising an input shaft for connection to a power source to be driven therefrom, an output shaft, a three-legged differential gear having a first leg connected to said output shaft to drive the same and a second leg driven from said input shaft at a speed proportional to the speed thereof, a positive drive of the toothed wheel type for driving the third leg of said differential from said input shaft, said drive including intermeshing irregular shaped gears for transforming constant speeds into uniformly varying speeds and mutilated gears for transmitting motion to said input legs only during the periods that certain sectors of said irregular shaped gears are meshing with each other, and means for adjusting said drive to gradually and steplessly vary the ratio between said input shaft and said third leg of said differential to thereby vary the speed of said output shaft.

7. A variable speed transmission, comprising an input shaft for connection to a power source to be driven therefrom, a speed leveling differential, means including intermeshing irregular shaped gears for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, an output shaft, means for transmitting motion from the output leg of said differential to said output shaft to rotate the same at a speed proportional to the speed of said output leg, and means for varying the range through which the speeds of said input legs are varied to thereby vary the speed of said output shaft.

8. A variable speed transmission, comprising an input shaft for connection to a power source to be driven therefrom, a speed leveling differential, means including intermeshing irregular shaped gears for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, an output shaft, means for transmitting motion from the output leg of said differential to said output shaft to rotate the same at a speed proportional to the speed of said output leg, and means for varying the speed range of said input legs through a sufficient number of degrees to vary the speed of said output shaft from zero to maximum in either direction of rotation.

9. A variable speed transmission, comprising an input shaft for connection to a power source to be driven therefrom, a speed leveling differential, means including intermeshing irregular shaped gears for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, an output shaft, a reversing differential having one of its legs connected to said output shaft to drive the same and a second leg driven from said input shaft at a speed proportional to the speed thereof and a third leg driven from the output leg of said speed leveling differential at a speed proportional to the speed thereof, and means for varying the speed range of the input legs of said speed leveling differential to thereby vary the speed of said output shaft.

10. A variable speed transmission, comprising an input shaft for connection to a power source to be driven therefrom, a speed leveling differential, means including intermeshing irregular shaped gears for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, an output shaft, a reversing differential having one of its legs connected to said output shaft to drive the same and a second leg driven from said input shaft at a speed proportional to the speed thereof and a third leg driven from the output leg of said speed leveling differential at a speed proportional to the speed thereof, and means for varying the speed range of the input legs of said speed leveling differential through a sufficient number of degrees to cause the speed of said output shaft to be varied from zero to maximum in either direction of rotation.

11. A variable speed transmission, comprising an input shaft for connection to a power source to be driven therefrom, a speed leveling differential, means including intermeshing irregular shaped gears for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, an output shaft, a reversing differential having one of its legs connected to said output shaft to drive the same and a second leg driven from said input shaft at a speed proportional to the speed thereof and a third leg driven from the output leg of said speed leveling differential at a speed proportional to the speed thereof, and means for varying the speed range of the input legs of said speed leveling differential to thereby vary the speed of said output shaft.

12. A variable speed transmission, comprising an input shaft for connection to a power source to be driven therefrom, a speed leveling differential, means including intermeshing irregular shaped gears for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, an output shaft, a reversing differential having one of its legs connected to said output shaft to drive the same and a second leg driven from said input shaft at a speed proportional to the speed thereof and a third leg driven from the output leg of said speed leveling differential at a speed proportional to the speed thereof, and means for varying the speed range of the input legs of said speed leveling differential through a sufficient number of degrees to cause the speed of said output shaft to be varied from zero to maximum in either direction of rotation.

13. A variable speed transmission, comprising an input shaft for connection to a power source to be driven therefrom, a speed leveling differential, means for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, said means including intermeshing irregular shaped gears for transforming constant speeds into uniformly varying speeds and mutilated gears for transmitting motion to said input legs only during the periods that certain sectors of said irregular shaped gears are meshing with each other, an output shaft, means for transmitting motion from said output leg to said output shaft to rotate the same at a speed proportional to the speed of said output leg, and means for adjusting said transmission to vary the speeds of said input legs to thereby vary the speed of said output shaft.

14. A variable speed transmission, comprising an input shaft for connection to a power source to be driven therefrom, a speed leveling differential, means for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, said means including intermeshing irregular shaped gears for transforming constant speeds into uniformly varying speeeds and mutilated gears for transmitting motion to said input legs only during the periods that certain sectors of said irregular shaped gears are meshing with each other, an output shaft, means for transmitting motion from said output leg to said output shaft to rotate the same at a speed proportional to the speed of said output leg, and means for adjusting said transmission to cause said mutilated gears to transmit motion to said input legs only during periods other sectors of said irregular shaped gears are meshing with each other to thereby vary the speed of said output shaft.

15. A variable speed transmission, comprising an input shaft for connection to a power source to be driven therefrom, a speed leveling differential, means for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, said means including intermeshing irregular shaped gears for transforming constant speeds into uniformly varying speeds and mutilated gears for transmitting motion to said input legs only during the periods that certain sectors of said irregular shaped gears are meshing with each other, an output shaft, means for transmitting motion from said output leg to said output shaft to rotate the same at a speed proportional to the speed of said output leg, and means for adjusting said transmission to vary the speeds of said input legs through a sufficiently wide range to cause the speed of said output shaft to be varied from zero to maximum in either direction of rotation.

16. A variable speed transmission, comprising an input shaft for connection to a power source to be driven therefrom, a speed leveling differential, means for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, said means including intermeshing irregular shaped gears for transforming constant speeds into uniformly varying speeds and mutilated gears for transmitting motion to said input legs only during the periods that certain sectors of said irregular shaped gears are meshing with each other, a reversing differential having one of its legs connected to said output shaft to drive the same and a second leg driven from said input shaft at a speed proportional to the speed thereof and a third leg driven from the output leg of said speed leveling differential at a speed proportional to the speed thereof, and means for adjusting said transmission to vary the speeds of said input legs to thereby vary the speed of said output shaft.

17. A variable speed transmission, comprising an input shaft for connection to a power source to be driven therefrom, a speed leveling differential, means for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, said means including intermeshing irregular shaped gears for transforming constant speeds into uniformly varying speeds and mutilated gears for transmitting motion to said input legs only during the periods that certain sectors of said irregular shaped gears are meshing with each other, a reversing differential having one of its legs connected to said output shaft to drive the same and a second leg driven from said input shaft at a speed proportional to the speed thereof and a third leg driven from the output leg of said speed leveling differential at a speed proportional to the speed thereof, and means for adjusting said transmission to cause said mutilated gears to transmit motion to said input legs only during periods other sectors of said irregular shaped gears are meshing with each other to thereby vary the speed of said output shaft.

18. A variable speed transmission, comprising an input shaft for connection to a power source to be driven therefrom, a speed leveling differential, means for driving the two input legs of said differential from said input shaft at speeds which vary uniformly and alternately between a minimum speed and a maximum speed and for accelerating one input leg at the same time that the other input leg is being decelerated whereby the output leg of said differential is driven at a constant speed equal to the resultant of the average speeds of said input legs, said means including intermeshing irregular shaped gears for transforming constant speeds into uniformly varying speeds and mutilated gears for transmitting motion to said input legs only during the periods that certain sectors of said irregular shaped gears are meshing with each other, a reversing differential having one of its legs connected to said output shaft to drive the same and a second leg driven from said input shaft at a speed proportional to the speed thereof and a third leg driven from the output leg of said speed leveling differential at a speed proportional to the speed thereof, and means for adjusting said transmission to vary the speeds of said input legs through a sufficiently wide range to cause the speed of said output shaft to be varied from zero to maximum in either direction of rotation.

PAUL SIMONDS.